United States Patent
Wright et al.

(10) Patent No.: US 9,591,353 B2
(45) Date of Patent: Mar. 7, 2017

(54) METHODS AND APPARATUS TO DETECT COMMERCIAL ADVERTISEMENTS ASSOCIATED WITH MEDIA PRESENTATIONS

(71) Applicant: The Nielsen Company (US), LLC, Schaumburg, IL (US)

(72) Inventors: David H. Wright, Safety Harbor, FL (US); Scott Wilson, Largo, FL (US); Ron Schwerer, Belleair Beach, FL (US); Ronan Heffernan, Wesley Chapel, FL (US)

(73) Assignee: The Nielsen Company (US), LLC, New York, NY (US)

( * ) Notice: Subject to any disclaimer, the term of this patent is extended or adjusted under 35 U.S.C. 154(b) by 127 days.

(21) Appl. No.: 14/554,268

(22) Filed: Nov. 26, 2014

(65) Prior Publication Data

US 2015/0082332 A1    Mar. 19, 2015

Related U.S. Application Data

(63) Continuation of application No. 12/827,701, filed on Jun. 30, 2010, now Pat. No. 8,925,024.

(Continued)

(51) Int. Cl.
*H04N 7/173* (2011.01)
*H04N 21/439* (2011.01)
(Continued)

(52) U.S. Cl.
CPC ..... *H04N 21/4394* (2013.01); *G06K 9/00744* (2013.01); *G06K 9/00765* (2013.01);
(Continued)

(58) Field of Classification Search
CPC .............. H04N 21/4394; H04N 5/147; G06K 9/00744; G06K 9/00765; H04H 60/48;
(Continued)

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| EP | 0161512 | 11/1985 |
| EP | 1021042 | 7/2000 |

(Continued)

OTHER PUBLICATIONS

Australian Government, IP Australia, "Patent Examination Report No. 1," issued in connection with Australian Patent Application No. 2013203753, Jun. 6, 2014 (3 pages).

(Continued)

*Primary Examiner* — Allen Wong
(74) *Attorney, Agent, or Firm* — Hanley, Flight & Zimmerman, LLC

(57) ABSTRACT

Methods and apparatus to detect commercial advertisements associated with media presentations are disclosed. An example method includes determining an amount of audio randomness an inter-segment audio frame. The example method also includes indicating the inter-segment audio frame as occurring at a commercial transition based on the amount of audio randomness of the at least one inter-segment audio frame.

18 Claims, 10 Drawing Sheets

Related U.S. Application Data

(60) Provisional application No. 61/291,735, filed on Dec. 31, 2009.

(51) Int. Cl.

| | | |
|---|---|---|
| *G06K 9/00* | (2006.01) | |
| *H04H 20/14* | (2008.01) | |
| *H04H 60/37* | (2008.01) | |
| *H04H 60/48* | (2008.01) | |
| *H04H 60/58* | (2008.01) | |
| *H04H 60/59* | (2008.01) | |
| *H04N 5/14* | (2006.01) | |

(52) U.S. Cl.
CPC .......... *H04H 20/14* (2013.01); *H04H 60/375* (2013.01); *H04H 60/48* (2013.01); *H04H 60/58* (2013.01); *H04H 60/59* (2013.01); *H04N 5/147* (2013.01)

(58) Field of Classification Search
CPC ........ H04H 60/59; H04H 20/14; H04H 60/58; H04H 60/375
USPC ...................................................... 725/105
See application file for complete search history.

(56) References Cited

U.S. PATENT DOCUMENTS

| | | |
|---|---|---|
| 4,782,401 A | 11/1988 | Faerber et al. |
| 4,885,632 A | 12/1989 | Mabey et al. |
| 5,040,217 A | 8/1991 | Brandenburg et al. |
| 5,151,788 A | 9/1992 | Blum |
| 5,333,091 A | 7/1994 | Iggulden et al. |
| 5,343,251 A | 8/1994 | Nafeh |
| 5,437,050 A | 7/1995 | Lamb et al. |
| 5,481,294 A | 1/1996 | Thomas et al. |
| 5,696,866 A | 12/1997 | Iggulden et al. |
| 5,748,263 A | 5/1998 | Ball |
| 5,826,165 A | 10/1998 | Echeita et al. |
| 5,987,210 A | 11/1999 | Iggulden et al. |
| 5,999,689 A | 12/1999 | Iggulden |
| 6,002,443 A | 12/1999 | Iggulden |
| 6,100,941 A | 8/2000 | Dimitrova et al. |
| 6,134,279 A | 10/2000 | Siochi et al. |
| 6,205,174 B1 | 3/2001 | Fert et al. |
| 6,208,385 B1 | 3/2001 | Konishi et al. |
| 6,327,390 B1 | 12/2001 | Sun et al. |
| 6,404,977 B1 | 6/2002 | Iggulden |
| 6,449,392 B1 | 9/2002 | Divakaran et al. |
| 6,459,459 B1 | 10/2002 | Ratakonda |
| 6,469,749 B1 | 10/2002 | Dimitrova et al. |
| 6,597,405 B1 | 7/2003 | Iggulden |
| 6,621,867 B1 | 9/2003 | Sazzad et al. |
| 6,675,174 B1 | 1/2004 | Bolle et al. |
| 6,771,316 B1 | 8/2004 | Iggulden |
| 7,043,746 B2 | 5/2006 | Ma |
| 7,170,566 B2 | 1/2007 | McGee et al. |
| 7,224,401 B2 | 5/2007 | Ackley et al. |
| 7,984,462 B2 | 7/2011 | Deng |
| 2002/0057893 A1 | 5/2002 | Wood et al. |
| 2002/0083440 A1 | 6/2002 | Dupuis et al. |
| 2002/0154885 A1 | 10/2002 | Covell et al. |
| 2002/0186768 A1 | 12/2002 | Dimitrova et al. |
| 2003/0053538 A1 | 3/2003 | Katsavounidis et al. |
| 2003/0123841 A1 | 7/2003 | Jeannin |
| 2004/0102247 A1 | 5/2004 | Smoot et al. |
| 2004/0226035 A1 | 11/2004 | Hauser, Jr. |
| 2004/0268380 A1 | 12/2004 | Divakaran et al. |
| 2005/0108745 A1 | 5/2005 | Linzer |
| 2005/0129330 A1 | 6/2005 | Shyshkin |
| 2005/0195334 A1 | 9/2005 | Yeh et al. |
| 2005/0223403 A1 | 10/2005 | Suito et al. |
| 2006/0056820 A1 | 3/2006 | Wu et al. |
| 2006/0174265 A1 | 8/2006 | Hauser, Jr. |
| 2008/0127244 A1* | 5/2008 | Zhang ................... H04N 5/147 725/32 |
| 2009/0285551 A1 | 11/2009 | Berry |
| 2010/0053442 A1 | 3/2010 | Kudo |
| 2011/0292291 A1 | 12/2011 | Deng |

FOREIGN PATENT DOCUMENTS

| | | |
|---|---|---|
| EP | 2341704 | 6/2011 |
| WO | 0161892 | 8/2001 |
| WO | 02093929 | 11/2002 |
| WO | 2005014676 | 11/2005 |
| WO | 2005124583 | 12/2005 |
| WO | 2005125198 | 12/2005 |
| WO | 2006020560 | 2/2006 |

OTHER PUBLICATIONS

Canadian Intellectual Property Office, "Office Action," issued in connection with Canadian Patent Application No. 2,722,750, Nov. 22, 2012 (2 pages).

Canadian Intellectual Property Office, "Office Action," issued in connection with Canadian Patent Application No. 2,722,750, Jan. 3, 2014 (2 pages).

European Patent Office, "Extended Search Report," issued in connection with European Patent Application No. 10015577.9, Jul. 7, 2011 (6 pages).

European Patent Office, "Office Action," issued in connection with European Patent Application No. 10015577.9, Oct. 9, 2014 (4 pages).

United States Patent and Trademark Office, "Office Action," issued in connection with U.S. Appl. No. 12/827,701, Apr. 11, 2012 (17 pages).

United States Patent and Trademark Office, "Final Office Action," issued in connection with U.S. Appl. No. 12/827,701, Dec. 18, 2012 (19 pages).

United States Patent and Trademark Office, "Office Action," issued in connection with U.S. Appl. No. 12/827,701, Dec. 31, 2013 (17 pages).

United States Patent and Trademark Office, "Final Office Action," issued in connection with U.S. Appl. No. 12/827,701, Aug. 12, 2014 (16 pages).

IP Australia, "Patent Examination Report No. 2," issued in connection with Application No. 2013203753, Apr. 9, 2015 (3 pages).

IP Australia, "Patent Examination Report No. 2," issued in connection with Application No. 2013203872, Apr. 7, 2015 (3 pages).

Canadian Intellectual Property Office, "Office Action," issued in connection with Canadian Patent Application No. 2,722,750, Feb. 20, 2015 (3 pages).

IP Australia, "Notice of Acceptance," issued in connection with Application No. 2013203872, Feb. 19, 2016, 2 pages.

European Patent Office, "Summons to attend oral proceedings pursuant to Rule 115(1) EPC," issued in connection with European Patent Application No. 10015577.9, mailed Mar. 24, 2016 (3 pages).

European Patent Office, "Communication under Rule 71(3) EPC," issued in connection with European Patent Application No. 10015577.9, mailed Oct. 12, 2016 (75 pages).

Canadian Intellectual Property Office, "Notice of Allowance," issued in connection with Canadian Patent Application No. 2,901,078, mailed Oct. 31, 2016, 1 page.

\* cited by examiner

INTER-SCENE AUDIO WAVEFORM

INTER-SEGMENT AUDIO WAVEFORM

METHODS AND APPARATUS TO DETECT COMMERCIAL ADVERTISEMENTS ASSOCIATED WITH MEDIA PRESENTATIONS

RELATED APPLICATIONS

This patent is a continuation of U.S. patent application Ser. No. 12/827,701, filed on Jun. 30, 2010, which claims the benefit of U.S. Provisional Patent Application Ser. No. 61/291,735, filed on Dec. 31, 2009, which are hereby incorporated by reference herein in their entirety.

FIELD OF THE DISCLOSURE

The present disclosure relates generally to monitoring media and, more particularly, to methods and apparatus to detect commercial advertisements associated with media presentations.

BACKGROUND

Advertisers are often interested in knowing whether their advertisements occurred and were placed as expected. Confirming the occurrence and placement of advertisements can be used for market research purposes, billing purposes, and advertisement campaign planning purposes. Such advertisements may be in the form of television advertisements or other video/audio advertisements including Internet streaming advertisements. Depending on the conveyance medium (e.g., print, radio, television, computer, etc.) used for advertising, different known techniques can be used to confirm the presentation of advertisements in those media.

DETAILED DESCRIPTION

Figure 1:
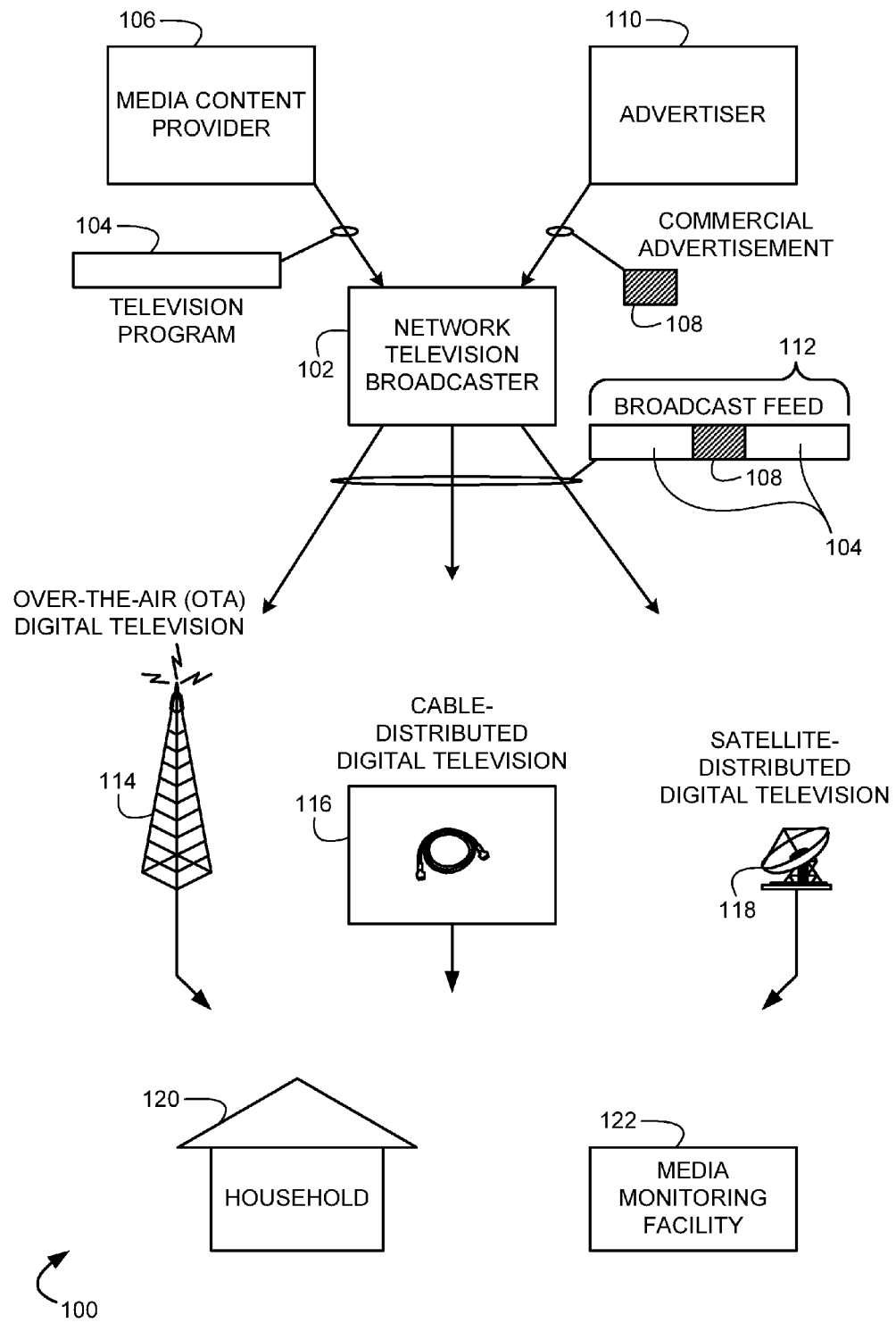
FIG. 1 depicts a digital television broadcast environment.

Although the following discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the following describes example methods, apparatus, systems, and articles of manufacture, the examples provided are not the only ways to implement such methods, apparatus, systems, and articles of manufacture.

The example methods, apparatus, and articles of manufacture described herein can be used to detect commercial advertisements associated with media presentations (e.g., in television transmission feeds). Although the example methods, apparatus, and articles of manufacture are described herein in connection with detecting commercial advertisement transitions in digital television transmission feeds, the example methods, apparatus, and articles of manufacture may also be used to detect commercial advertisement transitions in analog television transmission feeds and/or in other types of audio/video media including Internet-based media transmissions, video on demand media transmissions, remotely stored media for time-shifted media transmission, media transmissions stored locally for time-shifted viewing, etc.

Commercial detection can be used to identify placements of commercial advertisements in television program content and can be used as the basis for further identification processes to determine which specific commercials were presented at particular times. Such commercial detection and identification processes can be used to confirm that commercial advertisements were correctly presented and placed at pre-selected points of television program presentations or within pre-selected (e.g., contracted for) daytime or nighttime slots. In addition, such commercial detection and identification processes can also be used to identify when audience members are exposed to commercial advertisements during television program viewings. Television programs can be, for example, movies, sit-coms, dramas, television mini-series, etc. regardless of broadcast medium (e.g., terrestrial, satellite, radio frequency (RF), cable, etc.).

To facilitate commercial detection in digital television transmissions (and/or analog television transmissions), the methods, apparatus, and articles of manufacture described herein detect features or characteristics in digital television transmission feeds (and/or analog television transmissions) to identify transitions between a television program and a commercial advertisement and between different commercial advertisements. In this manner, commercial advertisements can be distinguished from television program content and commercial advertisements can also be distinguished from one another. Example feature/characteristic detection schemes to identify program/commercial transitions, commercial/commercial transitions, or commercial/program transitions include profile change detection and random audio detection, which are described in detail herein.

Although not necessary, in some example implementations, the program/commercial, commercial/commercial, and commercial/program transition detection techniques described herein can be used to trigger signature generation processes, watermark detection/collection processes, and/or ancillary code detection/collection processes. In this manner, when a transition is detected, a media detection process can be triggered to generate signatures of media content, detect/collect watermarks in media content, and/or detect/collect ancillary codes (e.g., audio or video codes embedded into the media content and/or in watermarks in the media content) from the media content to identify a displayed commercial advertisement (in the case of a program/commercial transition or a commercial/commercial transition) or a displayed television program (in the case of a commercial/program transition). In such example implementations, the collected signatures, watermark information, and/or codes can be time-stamped to form a timeline indicative of when television program segments occurred and when commercial advertisements occurred in broadcast digital television transmissions. In other example implementations, any other techniques may be used to identify displayed commercial advertisements in response to detecting commercial transitions as described herein.

Profile change detection involves detecting changes in useable and non-useable display areas of displayed video frames as a digital television program is decoded and video frames are reconstructed. A useable display area is the portion(s) of a video frame used to display video content that is relevant to and/or part of a media presentation on a screen. In contrast, non-useable display areas are portion(s) of a video frame that are displayed on a screen but that do not display relevant video content (e.g., video content that is relevant to and/or part of a media presentation on a screen). For example, non-useable display areas (or screen filler areas) can display black bars, gray bars, static network logo images, etc. that are not part of the primary content being displayed in the useable display areas. Such non-useable display areas may result from box formatting techniques used to adapt media content for presentation on television screens having different aspect ratios from the aspect ratios of the media content.

Common box formatting techniques include a pillarbox format, a letterbox format, and a windowbox format. Pillarbox formatting results in non-useable display areas (e.g., blank areas or static image areas) on the left and right sides bordering a useable display area. Letterbox formatting results in non-useable display areas on the top and bottom portions bordering a useable display area. Windowbox formatting results in non-useable display areas on the left and right sides and the top and bottom portions bordering a useable display area such that the useable display area appears embedded within an all-surrounding frame (or mat border) when displayed on a television.

In digital television broadcasting, box formatting may be used when the aspect ratio of a television program is different from the aspect ratio of a commercial advertisement that is inserted between different program segments of a television program. For example, if a television program is produced using a 16:9 aspect ratio (e.g., a widescreen display profile) and a commercial advertisement is produced using a 4:3 aspect ratio (e.g., a full-screen display profile), a network television broadcaster can adapt the commercial advertisement using a pillarbox format for insertion into the television program while maintaining a continuous 16:9 aspect ratio even between program/commercial transitions. In this manner, the resulting broadcasted digital television feed can be broadcast in its entirety using the 16:9 aspect ratio so that the broadcaster need not intermittently change the broadcasted aspect ratio when transitioning between program content and commercial advertisements. In some example implementations, box formatting changes can also occur when a television program is box formatted and a commercial advertisement is not. This can occur when a television program is not produced in a native 16:9 widescreen digital television format and a commercial advertisement is so formatted. By monitoring box formatting characteristics of a digital television feed, the methods, apparatus, and articles of manufacture described herein can generate information indicating that a possible commercial transition has been detected when the profile change detection techniques detect a change in the appearance of useable/non-useable display areas.

Random audio detection involves detecting audio frames having mostly random noise. Such random-noise audio frames can be indicative of transitions between program segments and commercial advertisements and transitions between different commercial advertisements. In digital television transmission feeds, when a broadcaster inserts commercial advertisements in different parts of a television program, the insertion process may also insert commercial transition video and audio frames between the television program frames and commercial advertisement frames. Such commercial transition frames typically exhibit some form of blank-like or silence-like (e.g., quiet audio) features or characteristics. These silence-like audio characteristics, which result from the process of splicing-in commercial advertisements, are typically not complete or absolute silence. Instead, although typically unintentional on the part of the broadcasters, the commercial transition frames often exhibit random noise characteristics that produce hiss-like audio due to several factors such as, for example, over-amplification.

The example methods, apparatus, and articles of manufacture described herein use the random noise characteristics of commercial transition audio frames to distinguish commercial transition audio frames from scene-change audio frames that also exhibit silence-like characteristics (e.g., near-silent or quiet audio) to indicate scene transitions within the same program segment. That is, the methods, apparatus, and articles of manufacture described herein can distinguish between commercial transition audio frames and scene transition audio frames based on the amount of audio randomness of each type of audio frame. While commercial transition audio frames exhibit a high level of random audio due to the commercial splicing process described above, scene transition audio frames exhibit relatively lower or no random audio characteristics. For example, because scene transition frames transition between content originally belonging to the same program, the audio content of the transition frames is relatively smoother or more continuous because there is no splicing disruption. Also, media content producers can intentionally insert background tones or other sounds in scene transition frames to produce a flowing effect or provide audibly perceptible continuity between scenes. Such background tones or other intentionally inserted sounds exhibit very low or no random characteristics whatsoever. In the illustrated examples described herein, commercial transition frames are identified as those frames having audio that exhibits a randomness factor exceeding a specified randomness threshold.

In the illustrated examples described herein, the feature/characteristic detection schemes (e.g., profile change detection and/or random audio detection) are used to generate commercial transition hints. Such hints are indications that a transition to a commercial advertisement may have occurred in a monitored digital television feed. When two or more different feature/characteristic detection techniques are used in a commercial detection system, such hints can be advantageously used in combination with a voting scheme to confirm occurrences of commercial advertisement transitions. For example, if a commercial detection system uses both profile change detection and random audio detection, each of the detection processes can concurrently generate a respective hint value (e.g., hint=1.0) when a commercial transition is suspected. Each of the two hint values can then be weighted based on the reliability (e.g., historical reliability or robustness) of their respective processes, and the weighted hint values can be aggregated to generate a weighted aggregate hint value. If the weighted aggregate hint value exceeds a specified threshold hint value, a commercial transition can be confirmed.

Although the example methods, apparatus, and articles of manufacture are described herein in detail in connection with profile change detection and/or random audio detection, commercial transition hints and their analyses can additionally or alternatively be used with other types of feature/characteristic detection techniques to confirm or ignore suggested commercial transitions. Other example types of feature/characteristic detection techniques are described below in connection with FIG. 10.

Turning to FIG. 1, a digital television broadcast environment 100 is shown depicting a manner in which digital television programs and commercial advertisements are distributed to viewers. In FIG. 1, a network television broadcaster 102 is shown receiving a television program 104 from a media content provider 106 and receiving a commercial advertisement 108 from an advertiser 110. In the illustrated example, the network television broadcaster 102 inserts or splices the commercial advertisement 108 into the television program 104 to generate a digital television broadcast feed 112. The television broadcast feed 112 can then be distributed or broadcasted by the network television broadcaster 102 through one or more broadcasting mediums including over-the-air (OTA) digital television broadcast media 114, cable distribution media 116, and/or satellite distribution media 118. Although not shown, other distribution media may include Internet-based distribution (e.g., internet-protocol television (IPTV)), wireless mobile network distribution, video on demand (VOD), Internet streaming (in time-shifted or live manner), etc. The example techniques described herein can additionally or alternatively be used in connection with such other types of distribution media.

The example commercial detection methods, apparatus, and articles of manufacture described herein can be used in households (e.g., a household 120) or in media monitoring facilities (e.g., a media monitoring facility 122). For example, the household 120 may be a panel member household in which media exposure monitoring is performed. A panel member household is a household including one or more person(s) that participate in an audience measurement program. The household 120 may be provided with a television/set-top-box monitoring device (e.g., a monitoring device including an example apparatus 1000 of FIG. 10) in which the example methods, apparatus, and articles of manufacture described herein can be implemented to detect occurrences of commercial advertisements during viewing sessions of digital television. The media monitoring facility 122 may be provided with a plurality of monitoring devices (e.g., devices including the example apparatus 1000 of FIG. 10) to monitor contents of television transmissions. The example methods, apparatus, and articles of manufacture described herein can also be implemented in such monitoring devices so that the media monitoring facility 122 can detect commercials in digital television transmissions.

In some example implementations, commercial advertisement insertion may additionally or alternatively be done by the media content provider 106. For example, for a nationally syndicated television show, the media content provider 106 may receive nation-wide commercial advertisements intended to appear nationally along with the syndicated television show. In such instances, the media content provider 106 may splice or insert the commercial advertisements into the stream of the television program 104 before distributing the television program to the network television broadcaster 102 (and other broadcasters) for broadcast transmission. Further to such an example implementation, the network television broadcaster 102 may have the option of replacing the nation-wide commercial advertisements with local commercial advertisements (e.g., commercial advertisements for local businesses and/or for local target audiences) such that the commercial advertisement 108 may be a local commercial advertisement intended to replace a nation-wide commercial advertisement pre-inserted in the television program 104.

In the illustrated example of FIG. 1, the television program 104 and/or the commercial advertisement 108 may be provided to the network television broadcaster 102 in analog or digital format. If provided in digital format, it may be provided in standard definition (SD) television format or high-definition (HD) television format. If provided in analog format or SD format, the network television broadcaster 102 can perform conversion and/or up scaling processes to generate native HD television transmission feeds. In this manner, the digital television broadcast feed 112 can be broadcast to viewers in HD format.

Figure 2:
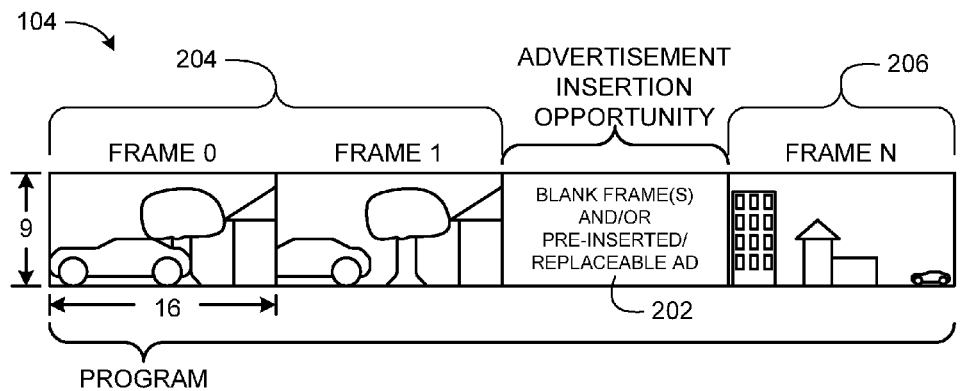
FIG. 2 depicts a television program feed provided by a media content provider of FIG. 1.

Turning now to FIG. 2, several frames of the television program 104 provided by the media content provider 106 of FIG. 1 are shown. In the illustrated example, the television program 104 has an advertisement insertion opportunity space 202 shown as one or more blank frames at which a commercial advertisement (e.g., the commercial advertisement 108 of FIG. 1) may be inserted by the network television broadcaster 102. As discussed above, commercial advertisement insertion opportunities in the television program 104 may be in the form of blank frames (as shown in FIG. 2) or in the form of other commercial advertisements pre-inserted by the media content provider 106 and replaceable by the network television broadcaster 102. For example, the advertisement insertion opportunity space 202 may include only blank frame(s), or it may include one or more blank frame(s) followed by a pre-inserted advertisement and/or promotional announcement to be potentially replaced, which is followed by another one or more blank frame(s).

In the illustrated example, the television program 104 is shown in a widescreen profile format having a 16:9 aspect ratio. The first two frames (frame 0 and frame 1) form a first program segment 204 and a frame N forms a second program segment 206. In the illustrated examples described herein, commercial advertisements are inserted into television programs between program segments of the television programs. For instance, FIG. 2 shows that the advertisement insertion opportunity space 202 appears between the first program segment 204 and the second program segment 206 so that a commercial advertisement (e.g., the commercial advertisement 108) can be inserted between the first and second program segments 204 and 206.

Figure 3:
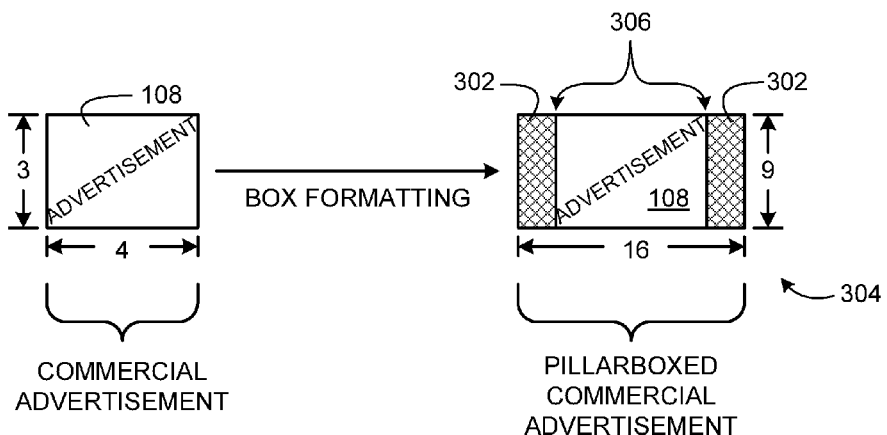
FIG. 3 depicts a commercial advertisement feed provided by an advertiser of FIG. 1 and a box formatting process performed on the commercial advertisement.

FIG. 3 depicts the commercial advertisement 108 provided by the advertiser 110 of FIG. 1 and a box formatting process performed on the commercial advertisement 108. In the illustrated example of FIG. 3, the aspect ratio of the commercial advertisement 108 is different from that of the television program 104 of FIGS. 1 and 2. In particular, the commercial advertisement 108 has an aspect ratio of 4:3 (full-screen profile), while the television program 104 has an aspect ratio of 16:9 (widescreen profile).

To enable insertion of the commercial advertisement 108 into the television program 104 while preserving the aspect ratio of the commercial advertisement 108, the commercial advertisement 108 is box formatted as shown in FIG. 3 to form a pillarboxed commercial advertisement 304. The type of box formatting used to facilitate inserting the 4:3 aspect ratio content of the commercial advertisement 108 into 16:9 aspect ratio frames is a pillarbox formatting. As shown, pillarbox formatting pads or fills left and right sides of a 16:9 video frame bordering the left and right sides of the advertisement 108 with screen filler areas 302 that are displayed concurrently with the commercial advertisement 108 on a 16:9 aspect ratio television screen. In the illustrated examples described herein, screen filler areas such as the screen filler areas 302 are non-useable display areas of displayed video frames as discussed above, while a useable display area of a video frame is that portion of the video frame displaying commercial advertisement content or television program content. In the illustrated example of FIG. 3, the useable display area is that portion of the pillarboxed commercial advertisement 304 that displays the commercial advertisement 108.

In some example implementations, the screen filler areas 302 can appear as black bars, gray bars or areas filled with any other solid color and/or pattern. In other example implementations, the screen filler areas 302 can be used to display television network logos or other readable or informative information, which may be displayed as static images or motion images. The example profile change detection techniques described herein can detect screen filler areas (e.g., the screen filler areas 302) of a screen using edge detection techniques associated with image recognition processes. Regardless of whether the screen filler areas 302 of FIG. 3 are filled with solid colors, static images, or motion images, bordering edges 306 between the commercial advertisement 108 (a useable display area) and the screen filler areas 302 (non-useable display areas) form respective, distinct edges between the separate display areas that are detectable using edge detection processes. In this manner, the profile change detection techniques described herein can determine when a profile change has occurred during a transition from one frame to another as discussed below in connection with FIG. 4. Additionally or alternatively, other image recognition/machine vision techniques can be used such as, for example, blob detection, color saturation detection, pattern detection/recognition, etc.

Figure 4:
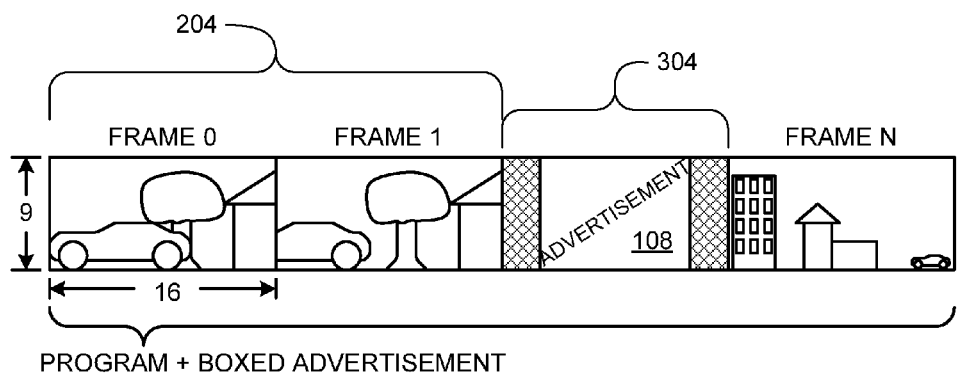
FIG. 4 depicts an example spliced television program and boxed commercial advertisement generated by a network television broadcaster or media content provider of FIG. 1.

FIG. 4 depicts an example spliced television program feed 400 including the television program 104 (FIGS. 1 and 2) and the pillarboxed commercial advertisement 304 of FIG. 3. In the illustrated example of FIG. 4, when the pillarboxed commercial advertisement 304 is inserted into the commercial insertion opportunity space 202 of FIG. 2, a profile change occurs during the transition between the first program segment 204 and the presentation of the pillarboxed commercial advertisement 304. That is, the frames of the first program segment 204 contain useable display areas that fill the entire portion of a 16:9 aspect ratio screen, while the pillarboxed commercial advertisement 304 contains the screen filler areas 302 (FIG. 3) bordering the 4:3 aspect ratio commercial advertisement 108. To detect the transition to the commercial advertisement 104, an edge detection process can be employed to monitor occurrences of edges in the regions of the 16:9 aspect ratio frames at which the edges 306 (FIG. 3) are expected to appear during transitions between a television program and a commercial advertisement.

Figure 5:
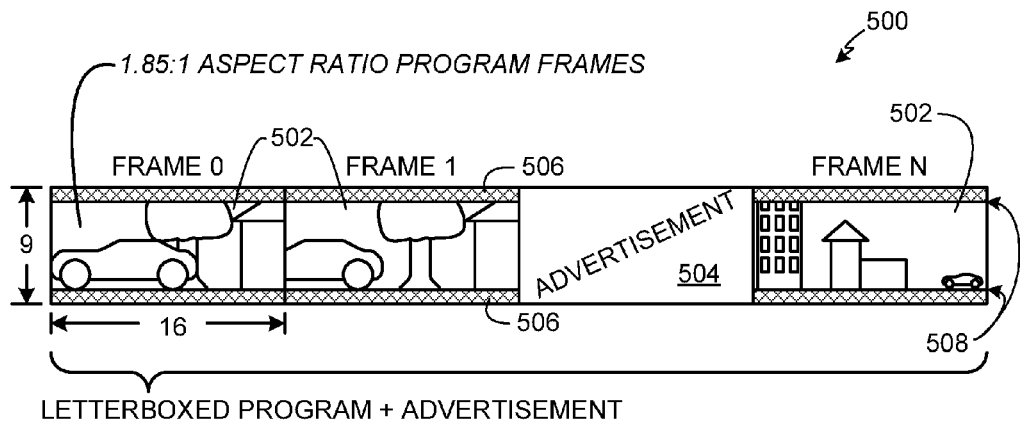
FIG. 5 depicts another example type of spliced television program and boxed commercial advertisement generated by a network television broadcaster or media content provider of FIG. 1.

FIG. 5 depicts another example spliced television program feed 500 exhibiting a different type of profile format change between television program frames and commercial advertisement frames. In particular, the example original television program frames 502 of FIG. 5 are produced using a 1.85:1 anamorphic widescreen aspect ratio, and the contents of the example commercial advertisement 504 fill 16:9 widescreen frames in their entirety. Unlike the television program 104 of FIGS. 1, 2, and 4 which has original frames that fill entire 16:9 aspect ratio video frames, the original television program frames 502 of FIG. 5 must be box formatted using letterbox formatting to maintain their original aspect ratios but still be displayable on 16:9 widescreen format television screens. However, the commercial advertisement 504 need not be box formatted for display on 16:9 widescreen format television screens because it is produced using 16:9 aspect ratio video frames.

The letterbox formatting for the original television program video frames 502 produces non-useable display areas 506 (e.g., screen filler areas) bordering top and bottom edges of the frames 502. The edges 508 created between the non-useable display areas 506 and the frames 502 can be detected using edge detection processes to facilitate detecting transitions to/from commercial advertisements. In particular, the example methods, apparatus, and articles of manufacture described herein can monitor the regions in which the edges 508 are expected to appear. When the edges 508 are detected as present, a transition to a commercial advertisement is not suspected as having occurred. However, when the edges 508 are no longer detected, a profile format change is detected, suggesting that a transition to a commercial has occurred. For example, in the illustrated example of FIG. 5, the edges 508 appear during presentation of the television program frames 502, but the edges 508 disappear when the 16:9 aspect ratio commercial advertisement 504 is displayed.

Figure 6:
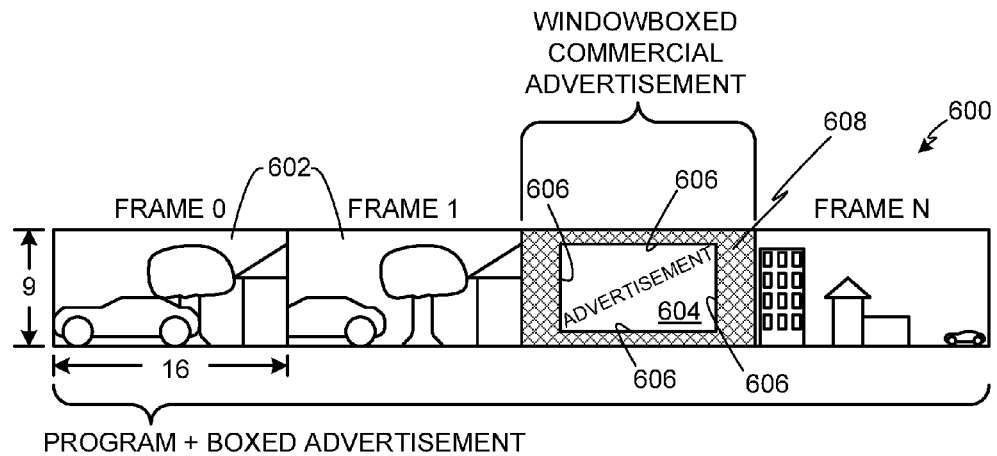
FIG. 6 depicts another example type of spliced television program and boxed commercial advertisement generated by a network television broadcaster or media content provider of FIG. 1.

FIG. 6 depicts another example digital television broadcast feed 600 having a different type of spliced program and boxed advertisement that can be generated by the network television broadcaster 102 or the media content provider 106 of FIG. 1. In the illustrated example of FIG. 6, television program frames 602 are produced using 16:9 aspect ratio video frames and an advertisement 604 is box formatted using a windowbox. The example methods, apparatus, and articles of manufacture for detecting profile changes can also be used with the type of profile change shown in FIG. 6 to identify transitions between television program content and commercial advertisement content or between different commercial advertisements. In particular, edge detection processes can be used to monitor any region of video frames where it can be expected that edges 606 would appear when displaying a commercial advertisement as a result of a screen filler area 608 associated with the windowbox formatting of the advertisement 604.

Although certain types of profile changes are depicted in FIGS. 4-6, the example methods, apparatus, and articles of manufacture described herein to detect profile changes can be used in connection with other types of profile changes. For example, a television program may be letterbox formatted (FIG. 5) and spliced-in commercial advertisements can be windowbox formatted (FIG. 6). In addition, transitions between different commercial advertisements can be detected based on profile changes between different commercial advertisements. Also, while the above describes detecting transitions from television program frames to commercial advertisement frames, the example methods, apparatus, and articles of manufacture described herein can similarly be used to detect transitions from commercial advertisement frames to television program frames to identify when commercial advertisements have ended and when a television program has resumed.

Figure 7:
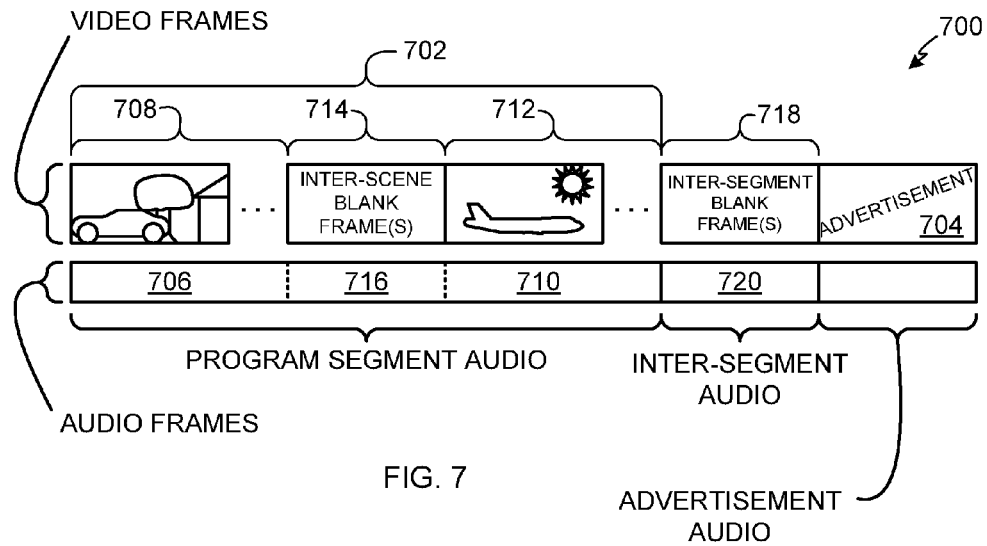
FIG. 7 depicts video and audio portions of an example spliced program and advertisement generated by the network television broadcaster of FIG. 1.

FIG. 7 depicts video and audio portions of an example digital television broadcast feed 700 having a television program segment 702 spliced with a commercial advertisement 704 generated by the network television broadcaster 102, a distributor, and/or the media content provider 106 of FIG. 1. In the illustrated example of FIG. 7, audio frames 706 correspond to a first scene 708 of the television program 702 and audio frames 710 correspond to a second scene 712. The first scene 708 is separated from the second scene 712 using one or more inter-scene blank frames 714 having one or more corresponding inter-scene audio frames 716. Also in the illustrated example of FIG. 7, the television program segment 702 is separated from the advertisement 704 by one or more inter-segment blank frames 718 having corresponding inter-segment blank audio frames 720.

In the illustrated example, the inter-scene audio frames 716 can have a near-silence or low-volume audio tone characteristic providing audible continuity between the scenes 708 and 712 to queue audience members of a scene change. Such audio characteristics of the inter-scene audio frames 716 exhibit a sufficiently high level of loudness or non-randomness, and the example techniques described herein interpret such loudness or non-randomness to determine that the inter-scene audio frames 716 do not hint at or demarcate a commercial transition.

Unlike the inter-scene audio frames 716, the inter-segment blank audio frames 720 separating a program segment from an advertisement (or separating two advertisements) exhibit audio characteristics having either a sufficiently low level of loudness or a relatively low level of loudness in combination with a higher randomness factor than the inter-scene audio frames 716 to enable identifying a commercial transition. A non-random or relatively low random characteristic of inter-scene audio frames 716 is shown by way of example in FIG. 8, and a high randomness characteristic of the inter-segment blank audio frames 720 is shown by way of example in FIG. 9.

The example methods, apparatus, and articles of manufacture described herein can monitor levels of randomness of blank audio frames to identify whether the blank audio frames correspond to inter-scene blank frames reflecting a scene change in a program such that subsequent video/audio frames are part of a television program or whether the blank audio frames correspond to inter-segment blank frames indicating a transition between program content and an advertisement (or vice versa). When a sufficiently high level of randomness is detected in combination with relatively quiet audio, a commercial advertisement transition has likely occurred.

In some example implementations, a random audio detection process is performed only if audio during transition audio frames (e.g., the inter-scene blank frame(s) 714 or the inter-segment blank frame(s) 718) is quiet audio but not sufficiently quiet to confirm that the transition audio frames are of the type (e.g., the inter-segment blank frame(s) 718) demarcating a commercial transition. For example, the techniques described herein can use a first audio level threshold to determine whether audio is sufficiently quiet to indicate a commercial transition without using a random audio analysis. A second audio level threshold (that is relatively higher than the first audio quietness threshold) can be used to determine whether audio is sufficiently quiet to indicate a commercial transition if corroborated by also being sufficiently random audio.

The techniques described herein can use the first audio level threshold to detect very quiet audio that is typically exhibited in inter-segment blank frame(s) 718 of pure HDTV audio signals that were not converted from original analog television signals. The second audio level threshold is higher than the first audio threshold level and can be used to detect relatively quiet audio with higher levels of noise that is typically exhibited in inter-segment blank frame(s) 718 of HDTV audio signals that were converted from original analog television audio.

In some example implementations, a root mean square operation can be used to identify audio levels in audio frames when monitoring for quiet audio portions. For example, a continuous digitized audio stream can be separated into slices that are approximately equivalent to one video frame such as, for example, one AC-3 frame of audio (0.032 seconds) or any other audio portion size.

For pure HDTV broadcasts (that were not converted from an analog source), the RMS value of silence is near zero. However, not all television broadcast stations provide such pure HDTV broadcasts. For example, some stations may convert analog signals to HDTV signals. Such digitization processes introduce low level noise (e.g., a hiss). Thus, using the audio monitoring techniques described herein, an audio frame having a RMS level below a first audio level threshold can be regarded as being a possible commercial transition without needing to perform a random audio analysis. For any audio frame having a RMS value above the first audio level threshold but below a second audio level threshold, a random audio analysis may be performed to confirm the likelihood that such relatively quiet audio is a commercial transition rather than an inter-scene blank frame 714 with a tone or other sound occurring between scene changes.

Figure 8:
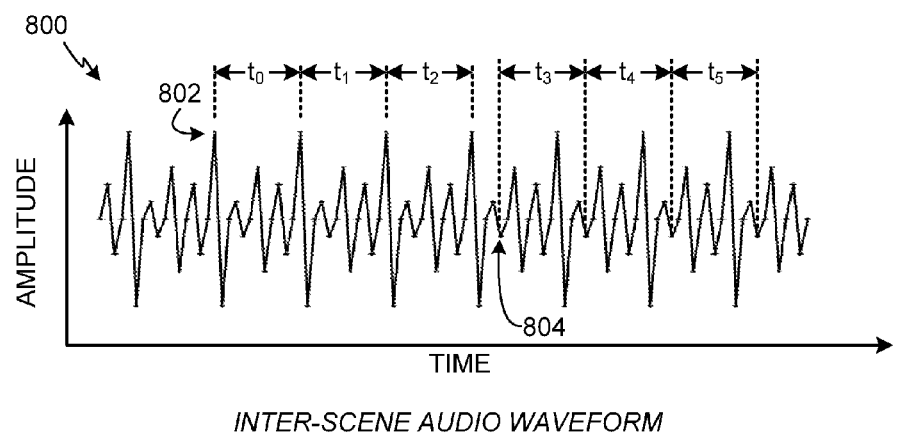
FIG. 8 depicts a time-based audio waveform of non-random audio that can accompany inter-scene blank frames within a program segment of a digital television feed.
Figure 9:
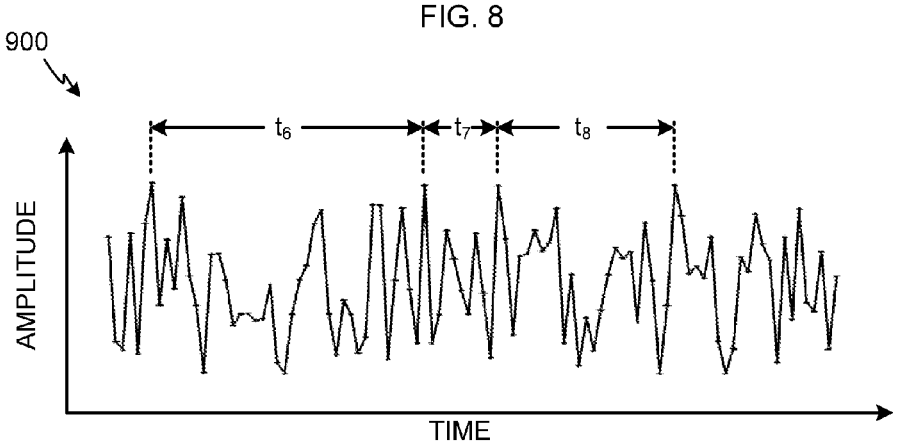
FIG. 9 depicts a time-based audio waveform of random audio that can accompany commercial-transition blank frames between program segments of a digital television feed.

FIG. 8 depicts an example time-based inter-scene audio waveform 800 of non-random audio that can accompany the inter-scene blank frames 714 of FIG. 7 within the television program segment 702 of the digital television broadcast feed 700. FIG. 9 depicts another example time-based audio waveform 900, which has random audio that can accompany the inter-segment blank audio frames 720 of FIG. 7. As discussed above, the example methods, apparatus, and articles of manufacture described herein can distinguish between inter-scene audio frames and inter-segment audio frames by detecting the amounts of randomness in the audio of those frames. In some examples, this degree of randomness is determined by counting the quantity of unique time-based distances between peaks and troughs of the respective time-based audio waveforms and generating a random-factor ratio (e.g., a randomness factor) by dividing the quantity of unique time-based distances by the number of total peak-to-peak distances and trough-to-trough distances. In the examples described herein, a peak is an audio sample having a local relative maximum amplitude value and a trough is an audio sample having a local relative minimum amplitude value.

To illustrate this approach of generating a randomness factor or a random-factor ratio of one or more audio frames, if 200 peaks (e.g., peaks having similar amplitude values) and 200 troughs (e.g., troughs having similar amplitude values) are identified and all of the peak-to-peak and trough-to-trough distances are either 17 or 18 audio samples apart, then there are two unique distances (i.e., 17 and 18) out of 400 total peaks and troughs. Thus, the random-factor ratio is 2:400 or 0.005 (i.e., the randomness factor). Such a random-factor ratio is indicative of a very non-random sound. In the illustrated example, such a random-factor ratio is indicative of a practically constant tone. If the sound were a highly-random "hiss," the corresponding audio frames would have a relatively higher quantity of peak-to-peak and trough-to-trough unique distances (e.g., 250 unique distances, for a randomness factor of 250:400 or 0.625). In some example implementations, to perform faster integer-based computations rather than slower floating-point computations, random-factor ratios can be multiplied by 1,000. Although the illustrated example, is described in connection with using time-based distances between amplitude peaks in combination with time-based distances between amplitude troughs, in other example implementations, time-based distances can be collected and used based on only amplitude peaks or based on only amplitude troughs.

In some implementations, other types of techniques may be used to determine randomness of audio signals. Other example randomness determination techniques include stochastic modeling, statistical tests, transforms, and/or complexity tests.

In the illustrated examples described herein, a randomness threshold can be used to determine whether audio is sufficiently random to indicate or suggest a commercial advertisement transition. The randomness threshold may be a predetermined value or may be a learned value that changes over time based on historical data, prediction algorithms, and/or manual adjustment. Such a randomness threshold could be in the form of a random-factor ratio value. Although an example randomness detection technique has been described as being implemented by counting peak-to-peak distances and trough-to-trough distances, in other example implementations other types of techniques can be used such as cryptography or other signal analysis techniques.

In FIG. 8, time-based distances or durations ($t_0$), ($t_1$), and ($t_2$) between select peaks 802 having similar amplitudes are substantially equal to one another and, thus, are counted as a single unique peak-to-peak distance. Time-based distances or durations ($t_3$), ($t_4$), and ($t_5$) between select troughs 804 of similar amplitudes are also substantially equal to one another and, thus, are counted as a single unique trough-to-trough distance. If the peak-to-peak distances and the trough-to-trough distances are all substantially equal or similar, then they are considered a single unique distance, otherwise they are considered two separate unique distances.

During a peak-to-peak or trough-to-trough duration measurement process, the durations between corresponding peaks or between corresponding troughs need not be exactly equal to one another to constitute a single unique distance. Instead, the peak-to-peak or trough-to-trough durations can be sufficiently the same within a particular tolerance threshold to constitute a single unique distance.

In contrast to FIG. 8, peaks and troughs of the time-based inter-segment audio waveform 900 of FIG. 9 exhibit random durations therebetween such that the randomness factor of the inter-segment audio waveform 900 is relatively high. For example, durations ($t_6$), ($t_7$), and ($t_8$) of select troughs 902 having similar amplitudes are not similar to one another and, thus, are counted as three separate and unique distances. A similar process can be used to analyze trough-to-trough distances. This dissimilarity in peak-to-peak durations is characteristic of the relatively high randomness of the inter-segment audio waveform 900. Such relatively high randomness is characteristic of inter-segment blank audio frames (e.g., the inter-segment blank audio frames 718 of FIG. 7), which can be indicative or suggestive of transitions between television program content and advertisement commercials or between separate advertisement commercials.

Figure 10:
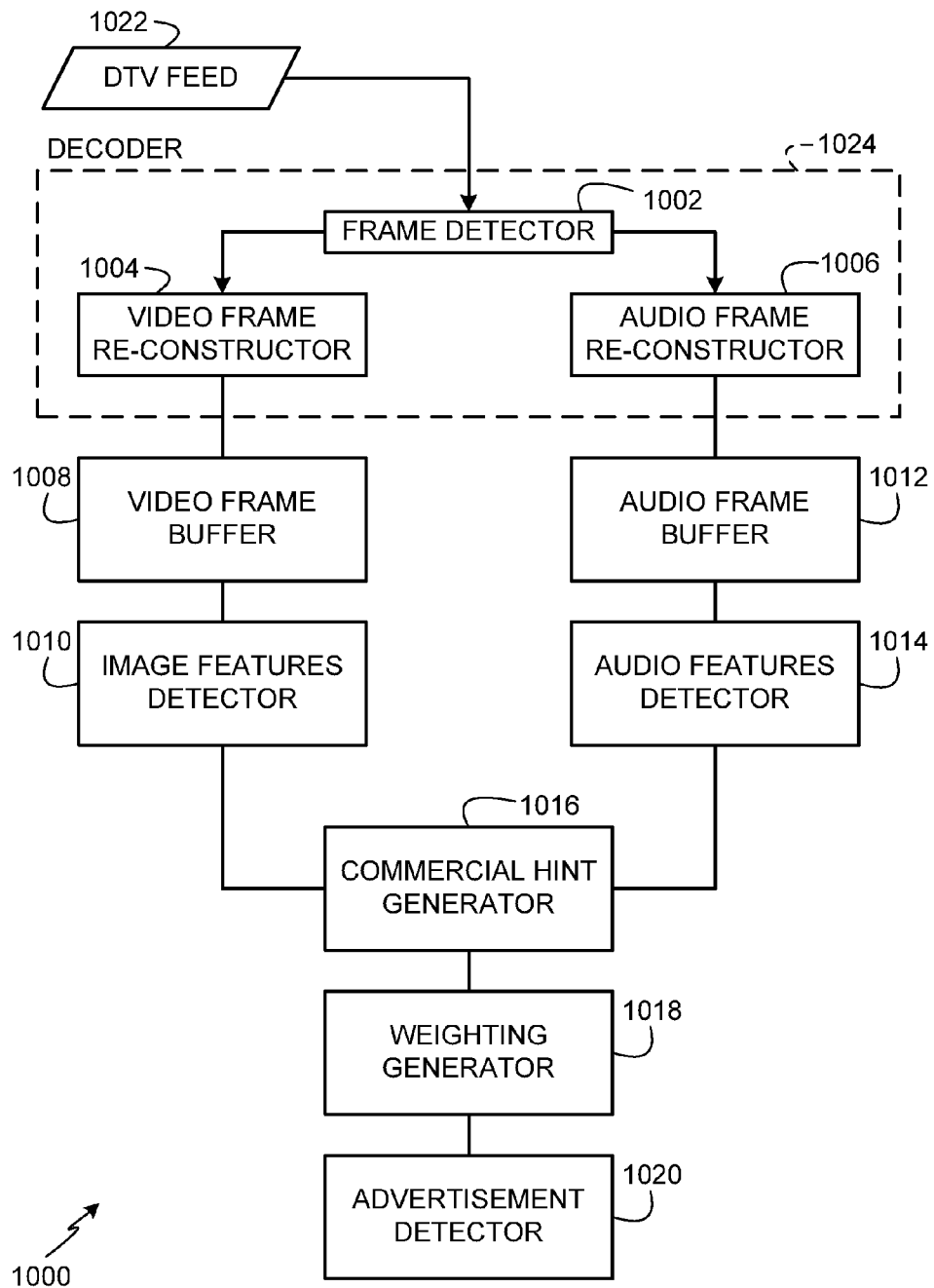
FIG. 10 depicts an example apparatus that can be used to detect commercial advertisements in digital television feeds.

FIG. 10 depicts an example apparatus 1000 that can be used to detect commercial advertisements (e.g., the commercial advertisements 108, 504, 604, and 704 of FIGS. 1 and 3-7) in digital television feeds (e.g., the digital television feeds 104, 112, 400, 500, 600, and 700 of FIGS. 1, 2, and 4-7). In the illustrated example, the example apparatus 1000 includes a frame detector 1002, a video frame re-constructor 1004, an audio frame re-constructor 1006, a video frame buffer 1008, an image features detector 1010, an audio frame buffer 1012, an audio features detector 1014, a commercial hint generator 1016, a weighting generator 1018, and an advertisement detector 1020. The example apparatus 1000 may be implemented using any desired combination of hardware, firmware, and/or software. For example, one or more integrated circuits, discrete semiconductor components, and/or passive electronic components may be used. Thus, for example, any of the frame detector 1002, the video frame re-constructor 1004, the audio frame re-constructor 1006, the video frame buffer 1008, the image features detector 1010, the audio frame buffer 1012, the audio features detector 1014, the commercial hint generator 1016, the weighting generator 1018, and/or the advertisement detector 1020, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 15:
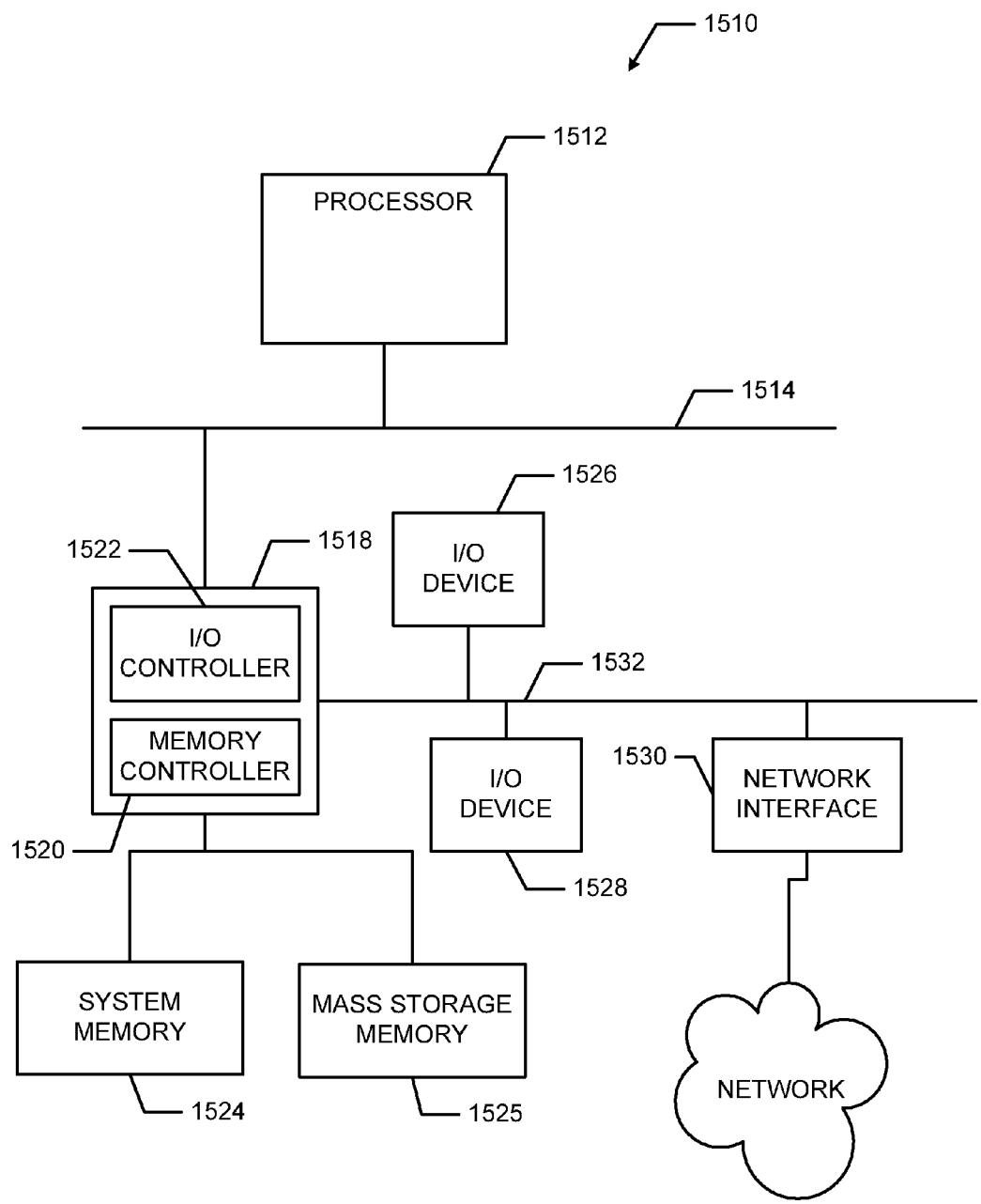
FIG. 15 is an example processor system that can be used to execute the example instructions of FIGS. 11, 12, 13, and/or 14 to implement the example apparatus of FIG. 10.

Some or all of the frame detector 1002, the video frame re-constructor 1004, the audio frame re-constructor 1006, the video frame buffer 1008, the image features detector 1010, the audio frame buffer 1012, the audio features detector 1014, the commercial hint generator 1016, the weighting generator 1018, and/or the advertisement detector 1020, or parts thereof, may be implemented using instructions, code, and/or other software and/or firmware, etc. stored on a tangible machine accessible medium and executable by, for example, a processor system (e.g., the example processor system 1510 of FIG. 15). When any of the appended apparatus claims are read to cover a purely software and/or firmware implementation, at least one of the frame detector 1002, the video frame re-constructor 1004, the audio frame re-constructor 1006, the video frame buffer 1008, the image features detector 1010, the audio frame buffer 1012, the audio features detector 1014, the commercial hint generator 1016, the weighting generator 1018, and/or the advertisement detector 1020 is hereby expressly defined to include a tangible medium such as a memory, a digital versatile disk (DVD), a compact disc (CD), etc. storing such software and/or firmware.

To receive and detect frames in a digital television feed 1022 (e.g., the digital television feeds 112, 400, 500, 600, and 700 of FIGS. 1, 4, 5, 6, and 7), the example apparatus 1000 is provided with the frame detector 1002. To re-construct video frames of the digital television feed 1022, the example apparatus 1000 is provided with the video frame re-constructor 1004. To re-construct audio frames of the digital television feed 1022, the example apparatus 1000 is provided with the audio frame re-constructor 1006. In some example implementations, the frame detector 1002, the video frame re-constructor 1004, and the audio frame re-constructor 1006 can be implemented as part of a video decoder 1024.

To store video frames for analysis, the example apparatus 1000 is provided with the video frame buffer 1008. For example, the video frame buffer 1008 may store video frames to perform image recognition processes such as edge detection processes (or other image recognition/machine vision processes) to detect changes in profile format as described above in connection with FIGS. 4-6. To perform image recognition/machine vision processes such as edge detection processes, the example apparatus 1000 is provided with the image features detector 1010. The example apparatus 1000 may be configured to control the image features detector 1010 to analyze regions of frames that may exhibit edges (e.g., the edges 306 (FIG. 3), the edges 508 (FIG. 5), the edges 606 (FIG. 6)) resulting from one or more type(s) of box formatting as described above in connection with FIGS. 3-6. Although the illustrated examples for profile change detection are described herein as using edge detection techniques, other image recognition/machine vision techniques could additionally or alternatively be used such as blob detection, color saturation detection, pattern detection/recognition, etc.

To store audio frames for analysis, the example apparatus 1000 is provided with the audio frame buffer 1012. For example, the audio frame buffer 1010 may store audio frames to perform random audio detection processes as described above in connection with FIGS. 7-9. To detect features of audio from digital television feeds and perform random audio detection processes, the example apparatus 1000 is provided with the audio features detector 1014. The example apparatus 1000 may be configured to control the audio features detector 1014 to detect audio frames having audio amplitudes below a certain power level (e.g., below a specified volume level indicative of near-silent or quiet audio) or audio frames corresponding with blank video frames and analyze the randomness of such audio frames to determine whether such audio frames are inter-scene audio frames (e.g., the inter-scene audio frames 716 of FIG. 7) or inter-segment audio frames (e.g., the inter-segment audio frames 720 of FIG. 7). As discussed above, the amount of randomness in near-silent or quiet audio frames can be indicative or suggestive of a transition to or from a commercial advertisement (e.g., the commercial advertisement 704 of FIG. 7).

To generate hints indicative or suggestive of a possible transition between a television program segment and a commercial advertisement or between separate commercial advertisements, the example apparatus 1000 is provided with the commercial hint generator 1016. The commercial hint generator 1016 may be configured to generate a hint with a detection technique identifier each time a possible commercial advertisement transition is suggested by a particular detection technique. For example, hints generated based on detecting a change in profile format (as discussed above in connection with FIGS. 3-6) may be provided with a unique identifier corresponding to the profile format detection technique, while hints generated based on detecting random audio in connection with blank video frames (as discussed above in connection with FIGS. 7-9) may be provided with a different unique identifier corresponding to the random audio detection technique.

To generate weighting values for different types of commercial hints generated by the commercial hint generator 1016, the example apparatus 1000 is provided with the weighting generator 1018. In the illustrated example, the weighting generator 1018 is configured to generate weight values based on the amount of confidence that should be placed on each type of hint to determine whether a commercial advertisement transition has actually occurred in a television program feed. Such weighting values can be based on historical data indicative of accuracy levels observed for each type of hint. Such accuracy levels may be representative of the percentage of times that generation of a particular type of hint was correctly indicative of an actual commercial advertisement transition. Additionally or alternatively, such weighting values can be based on the robustness or repeatability of different types of commercial transition detection techniques.

Weighted commercial hint values can be used in a voting-type process to determine or confirm whether a commercial advertisement transition actually occurred in a digital television feed. To implement the voting-type process, the example apparatus 1000 is provided with an advertisement detector 1020. In the illustrated example, the advertisement detector 1020 receives all of the different types of weighted commercial hint values generated for the same one or more video/audio frames of the digital television feed 1022. The advertisement detector 1020 then determines an aggregate weighted hint value of all the received weighted hint values and determines whether a commercial advertisement transition actually occurred based on whether the aggregate weighted hint value exceeds a weighted hint value threshold. The weighted hint value threshold may be predetermined or may change based on various factors or manual input.

Although the profile change detection technique and the random audio detection technique are described herein in detail, the commercial hint generator 1016 and the weighting generator 1018 can additionally or alternatively be used in connection with other types of commercial detection techniques. Such other types of commercial detection techniques can include detecting changes in frame aspect ratios of digital television feeds, detecting blank frames, detecting changes in audio formats (e.g., 5.1 audio, stereo audio, mono audio, etc.), detecting discontinuities in timing information (e.g., MPEG PresentationTimeStamp (PTS) codes) associated with digital encoding standards such as MPEG-2 coding standards (Motion Picture Expert Group (MPEG)), detecting startings/stoppings of closed-captioning text, detecting commercial insertion opportunity codes (e.g., SCTE35 codes in satellite television transmissions), and detecting ancillary audio and/or video identification codes embedded into frames of television programs and/or commercial advertisements.

Detecting changes in frame aspect ratios differs from the profile change detection techniques described herein. Under the profile changes described above in connection with FIGS. 3-6, the displayable video frame aspect ratio (e.g., what a television actually displays and a viewer actually sees displayed) of a digital television broadcast feed does not change when transitioning between a television program segment and a commercial advertisement. Instead, to keep the displayable video frame aspect ratio the same (e.g., a 16:9 aspect ratio) when transitioning between commercial advertisements and television program segments, box formatting techniques are used as described above. In contrast, detecting changes in displayable video frame aspect ratios involves detecting when a broadcaster has changed the aspect ratios of the displayable video frames. For example, a broadcaster may broadcast video frames of television program segments using a 16:9 aspect ratio and broadcast video frames of commercial advertisements using a 4:3 aspect ratio. The 4:3 aspect ratio video frames would either appear stretched on a 16:9 widescreen television screen or a television (or set-top-box) would pillarbox the 4:3 video frames locally at the viewing site and display the 4:3 aspect ratio video frames as pillarboxed frames on the 16:9 widescreen television screen.

The profile change detection techniques described herein can be advantageously used when broadcasters broadcast digital television programs and commercials without changing video frame aspect ratios and instead decide to box format video frames, when necessary, to fit a single aspect ratio (e.g., a 16:9 aspect ratio). Some broadcasters decide to broadcast in this manner (instead of transmitting every video frame in its native aspect ratio) to avoid frequent switching in broadcast aspect ratios and, thus, avoid any type of television broadcast, reception, decoding, or display error that could occur in the process.

Changes in audio formats can be indicative of transitions between television program segments and commercial advertisements. For example, an HD-quality digital television program may be broadcast with 5.1 surround sound audio, while a commercial advertisement may be broadcast with stereo or mono audio. These changes in audio formats within a digital television broadcast feed can be indicative or suggestive of transitions between television program segments and commercial advertisements.

Discontinuities in timing information associated with digital encoding standards (e.g., the MPEG-2 encoding standard) can also be indicative of transitions between television program segments and commercial advertisements. For example, when a commercial advertisement is inserted between television program segments, the media encoding timing information (e.g., MPEG PTS codes) associated with the television program segments is disrupted by the media encoding time information associated with the inserted commercial advertisement. These disruptions or discontinuities in media encoding timing information can be indicative or suggestive of transitions between television program segments and commercial advertisements.

Ancillary audio and/or video identification codes can be embedded into frames of television programs and/or commercial advertisements using watermarking techniques or any other code insertion techniques. Such codes or watermarks can be used to detect commercial advertisement transitions by detecting specific codes/watermarks corresponding to commercial advertisement content, changes from non-coded/non-watermarked content to coded/watermarked content, and/or changes from coded/watermarked content to non-coded/non-watermarked content. Such detections of specific codes/watermarks or changes between non-coded/non-watermarked content and coded/watermarked content can be indicative of a transition to or from a commercial advertisement.

Figure 11:
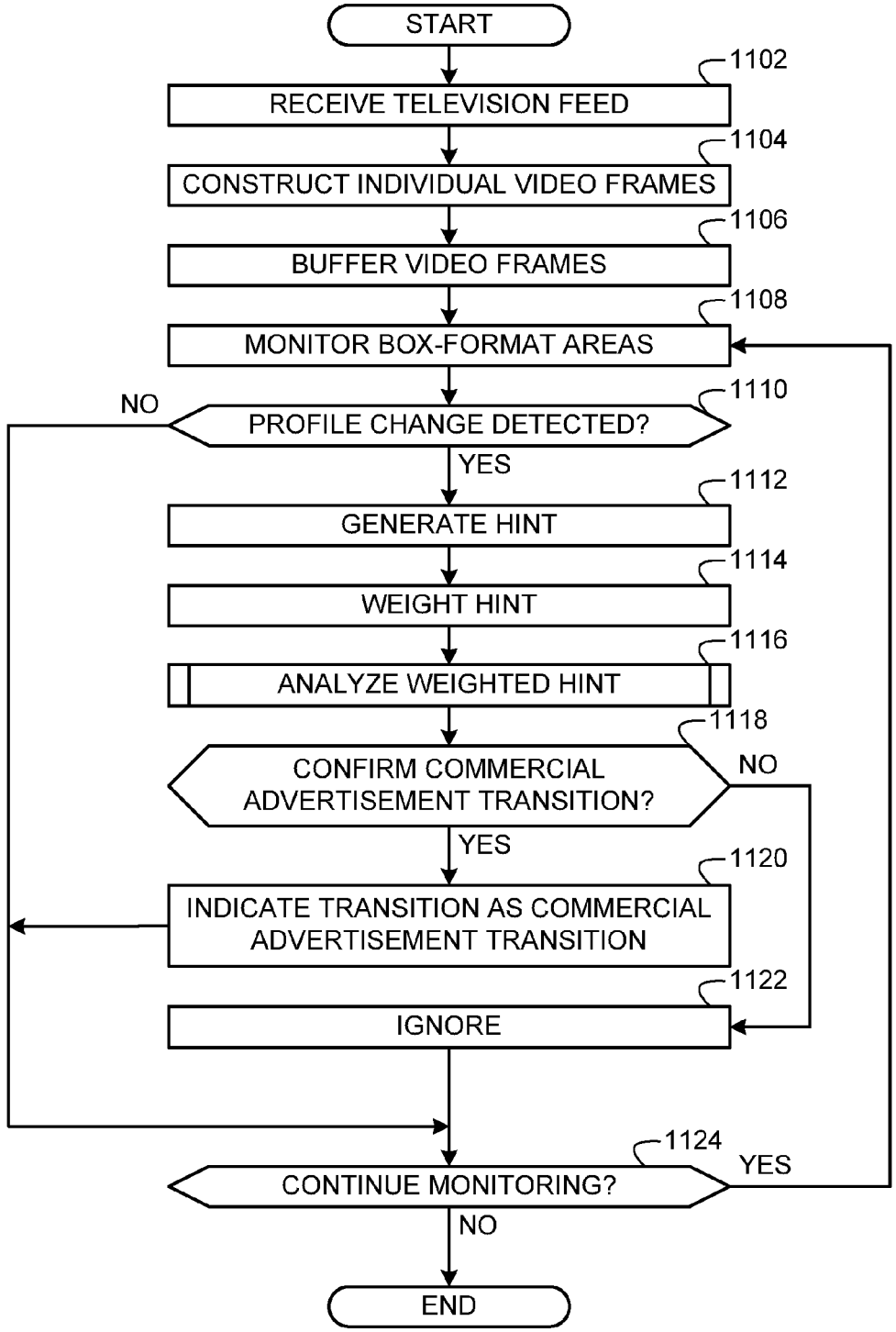
FIG. 11 is a flow diagram representative of example machine readable instructions that can be executed to detect commercial advertisements in digital television feeds based on monitoring video frames.
Figure 12:
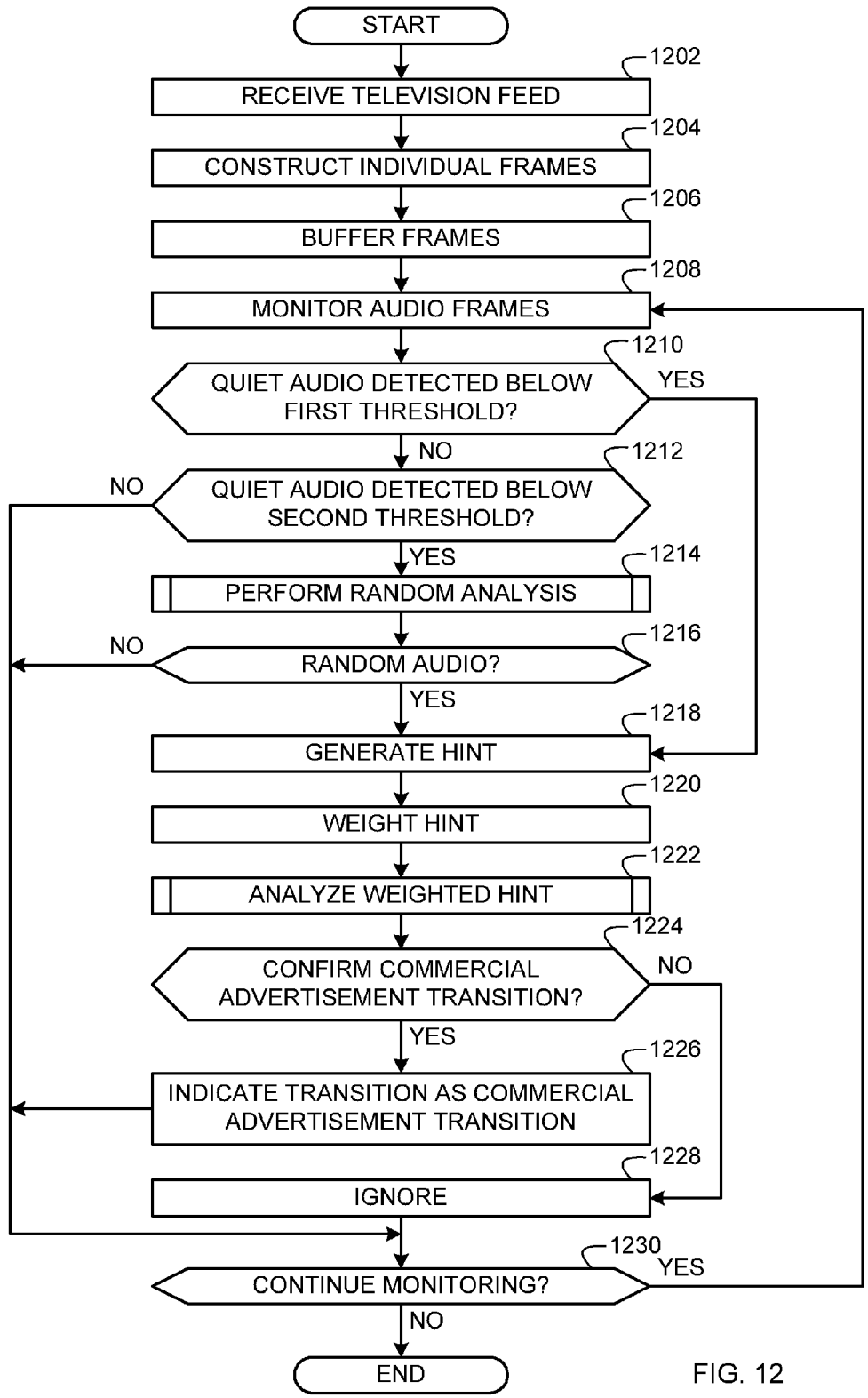
FIG. 12 is a flow diagram representative of example machine readable instructions that can be executed to detect commercial advertisements in digital television feeds based on monitoring audio frames.
Figure 13:
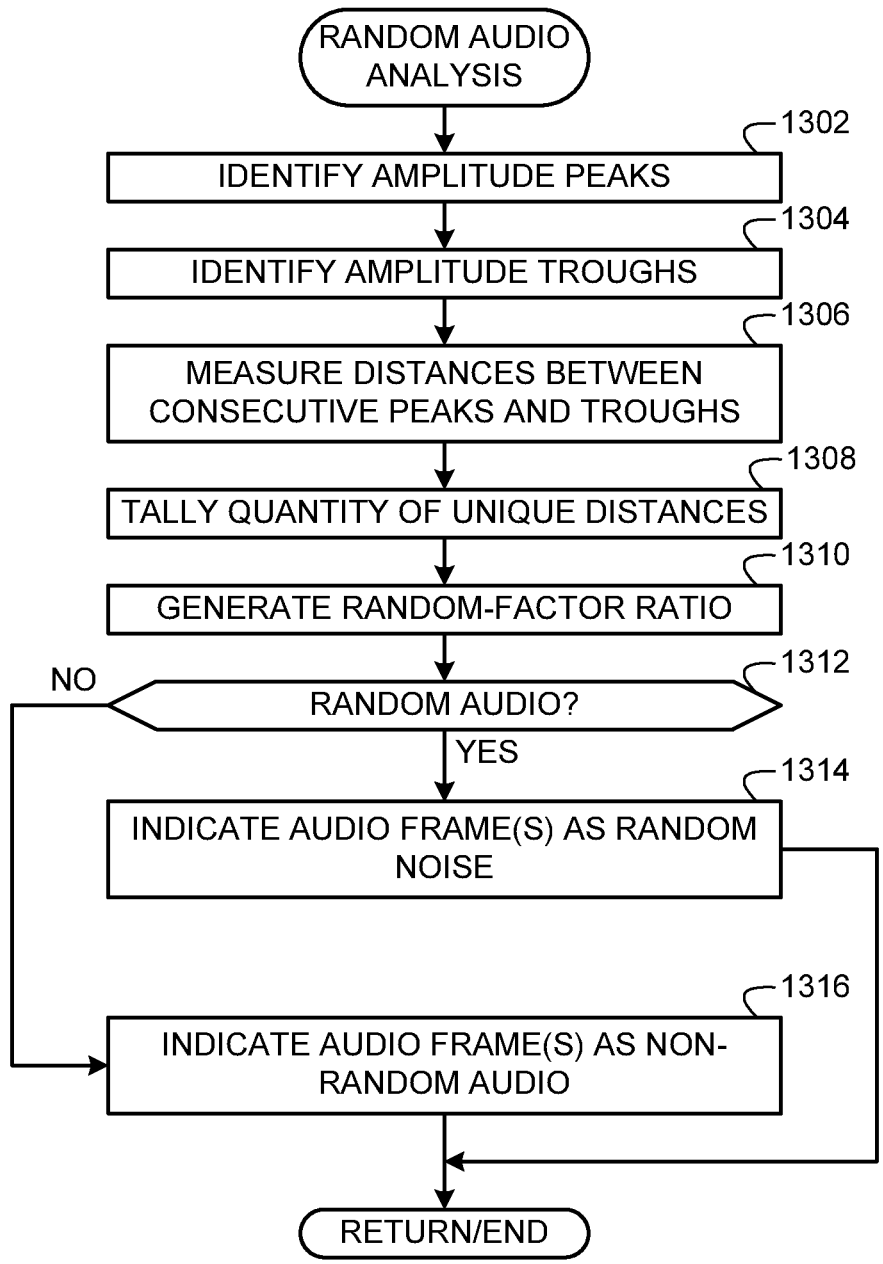
FIG. 13 is a flow diagram representative of example machine readable instructions that can be executed to perform random audio analyses in connection with the example process of FIG. 12.

FIGS. 11-13 are flow diagrams representative of machine readable instructions that can be executed to implement the methods and apparatus described herein. The example processes of FIGS. 11-13 may be implemented using machine readable instructions that, when executed, cause a device (e.g., a programmable controller or other programmable machine or integrated circuit) to perform the operations shown in FIGS. 11-13. For instance, the example processes of FIGS. 11-13 may be performed using a processor, a controller, and/or any other suitable processing device. For example, the example process of FIGS. 11-13 may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 11-13 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 11-13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 11-13 may be implemented as any combination(s) of any of the foregoing techniques, for example, any combination of firmware, software, discrete logic and/or hardware.

Although the example processes of FIGS. 11-13 are described with reference to the flow diagrams of FIGS. 11-13, other methods of implementing the processes of FIGS. 11-13 may be employed. For example, the order of execution of the blocks may be changed, and/or some of the blocks described may be changed, eliminated, sub-divided, or combined. Additionally, one or both of the example processes of FIGS. 11-13 may be performed sequentially and/or in parallel by, for example, separate processing threads, processors, devices, discrete logic, circuits, etc.

Turning now to FIG. 11, an illustrated flow diagram is representative of machine readable instructions that can be executed to detect commercial advertisements in digital television feeds based on monitoring box-format areas in video frames. The example process of FIG. 11 can be used to detect profile changes as discussed above in connection with FIGS. 3-6. Initially, frame detector 1002 (FIG. 10) receives a television feed (e.g., the digital television feed 1022 of FIG. 10) (block 1102). The video frame re-constructor 1004 (FIG. 10) constructs individual video frames (block 1104), and the video frame buffer 1008 (FIG. 10) buffers the re-constructed video frames (block 1106).

The image features detector 1010 (FIG. 10) monitors box-format areas (block 1108) of the buffered video frames.

The monitoring can be performed to detect the appearance or disappearance of screen filler areas (e.g., the screen filler areas 302 of FIG. 3, the non-useable display areas 506 of FIG. 5, or the screen filler area 608 of FIG. 6) between frame transitions. For example, the image features detector 1010 can perform edge detection processes in regions in which edges (e.g., the edges 306 (FIG. 3), 508 (FIGS. 5), and 606 (FIG. 6)) associated with box formatting would be expected to appear. The image features detector 1010 can use such edge detection processes to detect a change in the display of box-format edges such as a frame-to-frame transition that causes the box-format edges to appear or disappear. For example, referring to FIG. 4, a transition from the first program segment 204 to the pillarboxed commercial advertisement 304 causes the edges 306 (FIG. 3) to appear. Referring to FIG. 5, a transition from a television program segment to a commercial advertisement 504 causes the edges 508 to disappear due to the letterboxed television program frames and the non-boxed commercial advertisement 504. Thus, in FIG. 4, the appearance of box-format edges is suggestive of a commercial advertisement transition, while in FIG. 5, the disappearance of box-format edges is suggestive of a commercial advertisement transition. In alternative example implementations, other image recognition/machine vision techniques (e.g., blob detection, color saturation detection, pattern detection/recognition, etc.) can additionally or alternatively be used to detect the appearance or disappearance of screen filler areas between frame transitions.

The image features detector 1010 determines whether it has detected a profile change (e.g., a box-formatting change) in the buffered video frames (block 1110). For example, as discussed above, the image features detector 1010 can detect a profile change by using edge detection techniques to detect changes in the display of box-format edges. In other example implementations, other types of image recognition techniques could be used including blob detection, color saturation detection, etc.

If the image features detector 1010 detects a profile change in the buffered video frames (block 1110), the commercial hint generator 1016 (FIG. 10) generates a hint (block 1112). As discussed above, the hint indicates that a commercial advertisement transition may have occurred. The hint can be labeled, flagged, or tagged with an identifier indicative of the detection technique (e.g., profile change detection) that caused the hint to be generated. The weighting generator 1018 (FIG. 10) generates a weighting value for the hint (block 1114). As discussed above, the weighting value can be generated based on the amount of confidence that should be placed on the type of hint to determine whether a commercial advertisement transition has actually occurred in a television program feed.

The advertisement detector 1020 (FIG. 10) then analyzes the weighted hint value (block 1116). For example, as discussed above, the advertisement detector 1020 can receive multiple weighted hint values, each corresponding to a different technique used to detect a commercial advertisement transition at approximately the same time during a digital television program feed. In this manner, the advertisement detector 1020 can determine based on all the weighted hint values whether a commercial advertisement transition actually occurred. An example process that can be used to implement the weighted hint value analysis of block 1116 is described below in connection with FIG. 14.

If the advertisement detector 1020 confirms that a commercial advertisement transition has occurred (block 1118), the advertisement detector 1020 indicates a transition point of the digital television feed 1022 (FIG. 10) that corresponds to the one or more generated hints as a commercial advertisement transition (block 1120) (e.g., a transition from a television program segment to a commercial advertisement (or vice versa) or between two separate commercial advertisements). For example, the advertisement detector 1020 may indicate the transition point by forwarding a message indicative of the transition to a commercial identification system (not shown) to trigger the commercial identification system to identify a commercial advertisement presented following the transition point. Additionally or alternatively, the advertisement detector 1020 may indicate the transition point by labeling, flagging, or tagging the transition point in the digital television feed 1022 (FIG. 10) as a commercial advertisement transition.

If the advertisement detector 1020 determines that a commercial advertisement transition has not occurred (block 1118), the advertisement detector 1020 ignores the evaluated portion of the digital television feed 1022 that corresponds to the one or more generated hints (block 1122). After the advertisement detector 1020 ignores the evaluated portion of the digital television feed 1022 (block 1122) or after the advertisement detector 1020 indicates a transition point of the digital television feed 1022 as a commercial advertisement transition (block 1120) or if a profile change is not detected (block 1110), the example apparatus 1000 determines whether to continue monitoring (block 1124). If the example apparatus 1000 determines that it should continue monitoring (block 1124), control returns to block 1108. Otherwise, the example process of FIG. 11 is ended.

FIG. 12 is a flow diagram representative of machine readable instructions that can be executed to detect commercial advertisements in digital television feeds based on monitoring audio frames. The example process of FIG. 12 can be used to detect levels of randomness in quiet, silent, or near-silent audio frames as discussed above in connection with FIGS. 7-9. Initially, frame detector 1002 (FIG. 10) receives a television feed (e.g., the digital television feed 1022 of FIG. 10) (block 1202). The audio frame re-constructor 1006 (FIG.10) constructs individual audio frames (block 1204), and the audio frame buffer 1012 (FIG.10) buffers the re-constructed audio frames (block 1206).

The audio features detector 1014 monitors the buffered audio frames (block 1208). For example, the audio features detector 1014 can monitor for silent, near-silent, or quiet audio, which can be suggestive of commercial advertisement transitions as discussed above in connection with FIGS. 7-9. In the illustrative examples described herein, the audio features detector 1014 monitors the buffered audio frames based on first and second audio level thresholds discussed above in connection with FIG. 7 in which the first threshold indicates a lower audio level than the second threshold.

If the audio features detector 1014 detects silent, near-silent, or quiet audio below the first audio level threshold (block 1210), control advances to block 1218 at which a commercial transition hint is generated. However, if the audio features detector 1014 does not detect silent, near-silent, or quiet audio below a first audio level threshold (block 1210), the audio features detector 1014 compares the same portion of audio to the second audio level threshold (block 1212). If the audio features detector 1014 detects silent, near-silent, or quiet audio below the second audio level threshold (block 1212), the audio features detector 1014 performs a random audio analysis (block 1214) on the audio frames. An example process that can be used to perform the random audio analysis of block 1214 is discussed below in connection with FIG. 13.

If the audio features detector 1014 determines that the audio of the analyzed audio frames has a sufficiently high level of randomness (e.g., randomness above a random threshold level) (block 1216) or if the audio features detector 1014 detects silent, near-silent, or quiet audio below the first audio level threshold (block 1210), the commercial hint generator 1016 (FIG. 10) generates a hint (block 1218). As discussed above, the hint is suggestive that a commercial advertisement transition may have occurred. The hint is tagged with an identifier indicative of the detection technique that caused the hint to be generated. For example, the detection technique tag may indicate that the hint corresponds to detecting a sufficiently low audio level (e.g., block 1210) or detecting sufficiently random audio (e.g., block 1216). The weighting generator 1018 (FIG. 10) generates a weighting value for the hint (block 1220). As discussed above, the weighting value can be generated based on the amount of confidence that should be placed on the type of hint to determine whether a commercial advertisement transition has actually occurred in a television program feed.

The advertisement detector 1020 (FIG. 10) then analyzes the weighted hint value (block 1222). For example, as discussed above, the advertisement detector 1020 can receive multiple weighted hint values, each corresponding to a different technique used to detect a commercial advertisement transition at approximately the same time during a digital television program feed. In this manner, the advertisement detector 1020 can determine based on all the weighted hint values whether a commercial advertisement transition actually occurred. An example process that can be used to implement the weighted hint value analysis of block 1222 is described below in connection with FIG. 14.

If the advertisement detector 1020 confirms that a commercial advertisement transition has occurred (block 1224), the advertisement detector 1020 indicates a transition point of the digital television feed 1022 (FIG. 10) that corresponds to the one or more generated hints as a commercial advertisement transition (block 1226) (e.g., a transition from a television program segment to a commercial advertisement (or vice versa) or between two separate commercial advertisements). For example, the advertisement detector 1020 may indicate the transition point by forwarding a message indicative of the transition point to a commercial identification system (not shown) to trigger the commercial identification system to identify a commercial advertisement presented following the transition point. Additionally or alternatively, the advertisement detector 1020 may indicate the transition point by labeling, flagging, or tagging the transition point in the digital television feed 1022 (FIG. 10) as a commercial advertisement transition.

If the advertisement detector 1020 determines that a commercial advertisement transition has not occurred (block 1224), the advertisement detector 1020 ignores the evaluated portion of the digital television feed 1022 that corresponds to the one or more generated hints (block 1228). After the advertisement detector 1020 ignores the evaluated portion of the digital television feed 1022 (block 1228) or after the advertisement detector 1020 indicates a transition point in the digital television feed 1022 as having a commercial advertisement transition (block 1226) or if random audio is not detected (block 1216) or if silent, near-silent, or quiet audio below the second audio level threshold is not detected (block 1212), the example apparatus 1000 determines whether to continue monitoring (block 1230). If the example apparatus 1000 determines that it should continue monitoring (block 1230), control returns to block 1208. Otherwise, the example process of FIG. 12 is ended.

Although the example processes of FIGS. 11 and 12 are described using separate flow diagrams, the example processes could be implemented on the same commercial detection device and performed in parallel such that both commercial transition detection techniques can be used to generate respective types of hints indicative or suggestive of commercial advertisement transitions. In this manner, the advertisement detector 1020 (FIG. 10) can determine whether a commercial advertisement transition actually occurred based on both types of weighted hint values. Weighted hint values from other types of commercial transition detection techniques discussed above in connection with FIG. 10 may additionally or alternatively be used by the advertisement detector 1020 to perform weighted hint analyses.

FIG. 13 is a flow diagram representative of machine readable instructions that can be executed to perform random audio analyses in connection with the example process of FIG. 12. Initially, the audio features detector 1014 identifies the amplitude peaks (e.g., the peaks 802 of FIG. 8) (block 1302) and the amplitude troughs (e.g., the troughs 804 of FIG. 8) (block 1304) in one or more audio frames (e.g., one or more audio frames detected at block 1212 of FIG. 12 as having near-silent or quiet audio).

The audio features detector 1014 measures the time-based distances (or durations) between neighboring consecutive peaks and between neighboring consecutive troughs (block 1306) as discussed above in connection with FIGS. 8 and 9. The audio features detector 1014 then tallies the quantity of unique distances between peaks and troughs (block 1308) and generates a random-factor ratio (block 1310). For example, the audio features detector 1014 can generate the random-factor ratio as discussed above in connection with FIGS. 7-9 by dividing the quantity of unique distances by a total quantity of all of the peaks and troughs identified at blocks 1302 and 1304.

The audio features detector 1014 then determines whether the random-factor ratio indicates a sufficiently random audio signal to qualify as a commercial transition (block 1312). For example, the example apparatus 1000 can be provided (e.g., pre-programmed) with a random level threshold indicating an amount of randomness (based on a random-factor ratio) that should be found in audio to confirm the audio as being sufficiently random. In the illustrated examples described herein, such sufficient randomness is indicative or suggestive of a commercial advertisement transition.

If the audio features detector 1014 determines that the audio is sufficiently random to qualify as a commercial transition (block 1312), the audio features detector 1014 indicates the one or more audio frames as having random noise (e.g., label the one or more audio frames as a commercial transition) (block 1314), and the example process of FIG. 13 returns control to a calling function or process such as the example process of FIG. 12 and ends. Otherwise, if the audio features detector 1014 determines that the audio is not sufficiently random to qualify as a commercial transition (block 1312), the audio features detector 1014 indicates the one or more audio frames as having non-random audio (block 1316), and the example process of FIG. 13 returns control to a calling function or process such as the example process of FIG. 12 and ends. Although the flow diagram of FIG. 13 describes determining randomness based on distances between peaks and troughs, other types of techniques may be used to determine randomness of audio signals such as, for example, stochastic modeling, statistical tests, transforms, and/or complexity tests.

Figure 14:
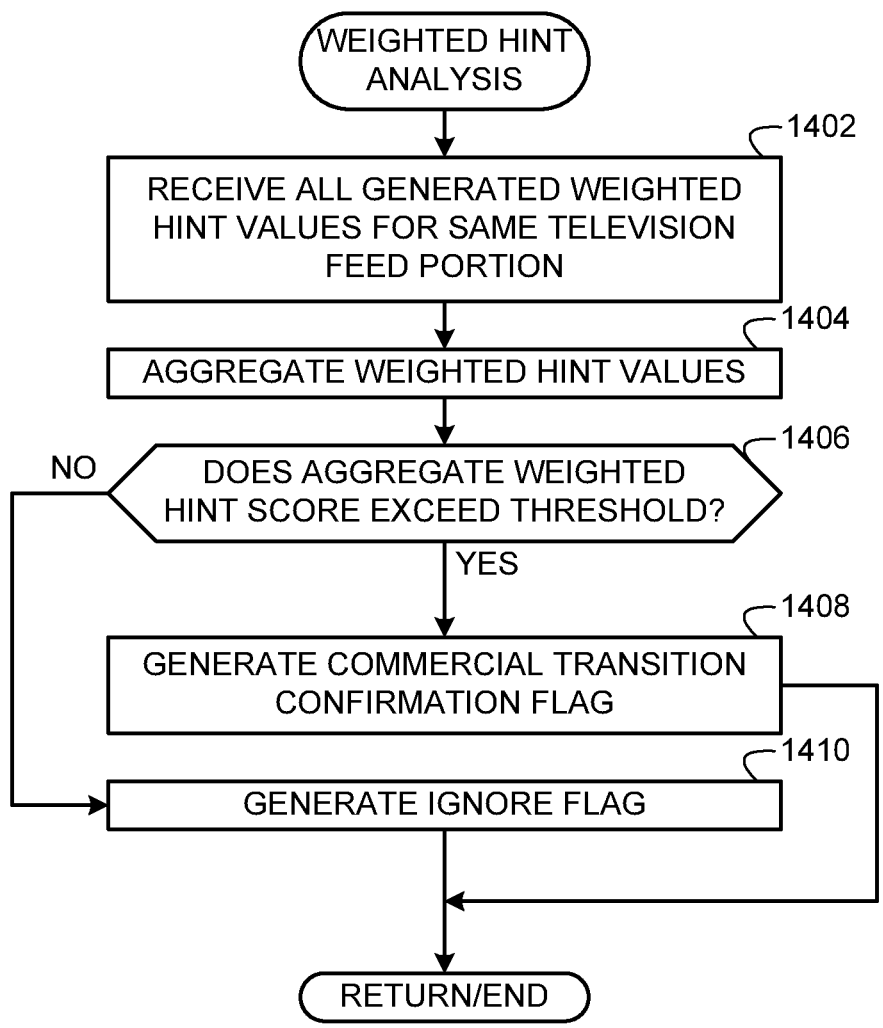
FIG. 14 is a flow diagram representative of example machine readable instructions that can be executed to perform weighted hint analyses in connection with the example processes of FIGS. 11 and 12 to confirm commercial advertisement transitions in digital television feeds.

FIG. 14 is a flow diagram representative of machine readable instructions that can be executed to perform weighted hint analyses in connection with the example processes of FIGS. 11 and 12 to confirm commercial advertisement transitions in digital television feeds. Initially, the advertisement detector 1020 (FIG. 10) receives all of the generated hint values for the same television feed portion (e.g., all hints generated for the transition between the first program segment 204 and the pillarboxed commercial advertisement 304 of FIG. 4 or all hints generated for the inter-segment blank frames 718 of FIG. 7) (block 1402). The advertisement detector 1020 aggregates all of the weighted hint values (block 1404) and determines whether the aggregate weighted hint score exceeds a weighted hint threshold (block 1406). The weighted hint threshold value may be a pre-determined value selected as an indicator of the amount of hint score confidence that needs to exist to confirm that a commercial advertisement transition has occurred. As explained above, the weighted hint threshold may vary over time.

If the advertisement detector 1020 determines that the aggregate weighted hint score exceeds the weighted hint threshold (block 1406), the advertisement detector 1020 generates a commercial advertisement transition confirmation flag (block 1408). Otherwise, if the advertisement detector 1020 determines that the aggregate weighted hint score does not exceed the weighted hint threshold (block 1406), the advertisement detector 1020 generates an ignore flag (block 1410). After the advertisement detector 1020 generates a commercial advertisement transition confirmation flag at block 1408 or generates an ignore flag at block 1410, control returns to a calling function or process such as the example process of FIG. 11 or the example process of FIG. 12 and the example process of FIG. 14 ends.

FIG. 15 is a block diagram of an example processor system 1510 that may be used to implement the example apparatus, methods, and systems described herein. For example, a processor system substantially similar or identical to the example processor system 1510 may be used to implement the example apparatus 1000 of FIG. 10.

As shown in FIG. 15, the processor system 1510 includes a processor 1512 that is coupled to an interconnection bus 1514. The processor 1512 may be any suitable processor, processing unit, or microprocessor. Although not shown in FIG. 15, the system 1510 may be a multi-processor system and, thus, may include one or more additional processors that are identical or similar to the processor 1512 and that are communicatively coupled to the interconnection bus 1514.

The processor 1512 of FIG. 15 is coupled to a chipset 1518, which includes a memory controller 1520 and an input/output (I/O) controller 1522. A chipset provides I/O and memory management functions as well as a plurality of general purpose and/or special purpose registers, timers, etc. that are accessible or used by one or more processors coupled to the chipset 1518. The memory controller 1520 performs functions that enable the processor 1512 (or processors if there are multiple processors) to access a system memory 1524 and a mass storage memory 1525.

In general, the system memory 1524 may include any desired type of volatile and/or non-volatile memory such as, for example, static random access memory (SRAM), dynamic random access memory (DRAM), flash memory, read-only memory (ROM), etc. The mass storage memory 1525 may include any desired type of mass storage device including hard disk drives, optical drives, tape storage devices, etc.

The I/O controller 1522 performs functions that enable the processor 1512 to communicate with peripheral input/output (I/O) devices 1526 and 1528 and a network interface 1530 via an I/O bus 1532. The I/O devices 1526 and 1528 may be any desired type of I/O device such as, for example, a keyboard, a video display or monitor, a mouse, etc. The network interface 1530 may be, for example, an Ethernet device, an asynchronous transfer mode (ATM) device, an 802.11 device, a digital subscriber line (DSL) modem, a cable modem, a cellular modem, etc. that enables the processor system 1510 to communicate with another processor system.

While the memory controller 1520 and the I/O controller 1522 are depicted in FIG. 15 as separate functional blocks within the chipset 1518, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method to detect a commercial transition associated with a media presentation, the method comprising:
   determining, by executing an instruction with a processor, an amount of audio randomness of an inter-segment audio frame by:
       determining, by executing an instruction with the processor, a quantity of unique time-based distances between at least one of a plurality of amplitude peaks or a plurality of amplitude troughs in the inter-segment audio frame; and
       determining, by executing an instruction with the processor, a random-factor ratio corresponding to the quantity of unique time-based distances divided by a total quantity of time-based distances between the at least one of the amplitude peaks or the amplitude troughs; and
   indicating, by executing an instruction with the processor, the inter-segment audio frame as occurring at a commercial transition based on the amount of audio randomness of the inter-segment audio frame.

2. The method as defined in claim 1, wherein the indicating of the inter-segment audio frame as occurring at the commercial transition based on the amount of audio randomness of the inter-segment audio frame includes indicating the inter-segment audio frame as occurring at the commercial transition when the amount of audio randomness exceeds a threshold.

3. The method as defined in claim 1, wherein the commercial transition includes at least one of a transition between two commercial advertisements or a transition between a commercial advertisement and a media program.

4. The method as defined in claim 1, wherein the inter-segment audio frame is reconstructed from at least one of a television transmission, an internet-streamed video, or a video-on-demand video.

5. The method as defined in claim 1, wherein the determining of the amount of audio randomness of the inter-segment audio frame is performed in response to detecting quiet audio in the inter-segment audio frame.

6. The method as defined in claim 1, wherein the amount of audio randomness of the inter-segment audio frame is indicative of an inter-segment blank frame occurring between two media program segments.

7. A method to detect a commercial transition associated with a media presentation, the method comprising:
   determining, by executing an instruction with a processor, an amount of audio randomness of an inter-segment audio frame;
   determining, by executing an instruction with the processor, a root-mean-squared value of audio in the inter-segment audio frame, the determining of the amount of audio randomness of the inter-segment audio frame being performed in response to the root-mean-squared value of the audio exceeding a first threshold and being less than a second threshold; and
   indicating, by executing an instruction with the processor, the inter-segment audio frame as occurring at a commercial transition based on the amount of audio randomness of the inter-segment audio frame.

8. An apparatus to detect a commercial transition associated with a media presentation, the apparatus comprising:
   an audio features detector to determine an amount of audio randomness of an audio frame by:
      determining a quantity of unique time-based distances between at least one of a plurality of amplitude peaks or a plurality of amplitude troughs in the audio frame; and
      determining a random-factor ratio corresponding to the quantity of unique time-based distances divided by a total quantity of time-based distances between the at least one of the amplitude peaks or the amplitude troughs; and
   an advertisement detector to indicate the audio frame as occurring at a commercial transition based on the amount of audio randomness of the audio frame.

9. The apparatus as defined in claim 8, wherein the advertisement detector is to indicate the audio frame as occurring at the commercial transition when the amount of audio randomness exceeds a threshold.

10. The apparatus as defined in claim 8, wherein the commercial transition includes at least one of a transition between two commercial advertisements or a transition between a commercial advertisement and a media program.

11. The apparatus as defined in claim 8, wherein the audio frame is reconstructed from at least one of a television transmission, an internet-streamed video, or a video-on-demand video.

12. The apparatus as defined in claim 8, wherein the audio features detector is to determine the amount of audio randomness of the audio frame in response to detecting quiet audio in the audio frame.

13. The apparatus as defined in claim 8, wherein the amount of audio randomness of the audio frame is indicative of an inter-scene blank frame occurring in a media program or an inter-segment blank frame occurring between two media program segments.

14. A tangible computer readable medium comprising instructions stored thereon that, when executed, cause a processor to:
   determine an amount of audio randomness of an inter-segment audio frame by
      determining a quantity of unique time-based distances between at least one of a plurality of amplitude peaks or a plurality of amplitude troughs in the audio frame; and
      determining a random-factor ratio corresponding to the quantity of unique time-based distances divided by a total quantity of time-based distances between the at least one of the amplitude peaks or the amplitude troughs; and
   indicate the inter-segment audio frame as occurring at a commercial transition based on the amount of audio randomness of the inter-segment audio frame.

15. The computer readable medium as defined in claim 14, wherein the instructions, when executed, cause the processor to indicate the audio frame as occurring at the commercial transition when the amount of audio randomness exceeds a threshold.

16. The computer readable medium as defined in claim 14, wherein the inter-segment audio frame is reconstructed from at least one of a television transmission, an internet-streamed video, or a video-on-demand video.

17. The computer readable medium as defined in claim 14 having instructions stored thereon that, when executed, cause the processor to determine the amount of audio randomness of the inter-segment audio frame in response to detecting quiet audio in the inter-segment audio frame.

18. The computer readable medium as defined in claim 14, wherein the amount of audio randomness of the inter-segment audio frame is indicative of an inter-scene blank frame occurring in a media program or an inter-segment blank frame occurring between two media program segments.

* * * * *